US010966034B2

(12) United States Patent
Andersen et al.

(10) Patent No.: US 10,966,034 B2
(45) Date of Patent: Mar. 30, 2021

(54) METHOD OF OPERATING A HEARING DEVICE AND A HEARING DEVICE PROVIDING SPEECH ENHANCEMENT BASED ON AN ALGORITHM OPTIMIZED WITH A SPEECH INTELLIGIBILITY PREDICTION ALGORITHM

(71) Applicant: Oticon A/S, Smørum (DK)

(72) Inventors: Asger Heidemann Andersen, Smørum (DK); Jan M. De Haan, Smørum (DK); Jesper Jensen, Smørum (DK)

(73) Assignee: OTICON A/S, Smørum (DK)

( * ) Notice: Subject to any disclaimer, the term of this patent is extended or adjusted under 35 U.S.C. 154(b) by 252 days.

(21) Appl. No.: 16/249,306

(22) Filed: Jan. 16, 2019

(65) Prior Publication Data

US 2019/0222943 A1 Jul. 18, 2019

(30) Foreign Application Priority Data

Jan. 17, 2018 (EP) .................................... 18151990

(51) Int. Cl.
*G10L 21/00* (2013.01)
*H04R 25/00* (2006.01)
(Continued)

(52) U.S. Cl.
CPC ........ *H04R 25/507* (2013.01); *G10L 21/0364* (2013.01); *G10L 25/84* (2013.01);
(Continued)

(58) Field of Classification Search
CPC ....... G10L 21/00; G10L 21/02; G10L 21/057; G10L 21/0364
See application file for complete search history.

(56) References Cited

U.S. PATENT DOCUMENTS 9,064,502 B2 * 6/2015 Taal ........................ G10L 25/69
2010/0299148 A1 * 11/2010 Krause .................... G10L 25/69 704/237

FOREIGN PATENT DOCUMENTS

EP 3 203 472 A1 8/2017
EP 3 229 496 A1 8/2017
EP 3203472 A1 * 8/2017 ........... H04R 25/505

OTHER PUBLICATIONS

Xu, et al., "A Regression Approach to Speech Enhancement Based on Deep Neural Networks," 2015 (Year: 2015).*
(Continued)

*Primary Examiner* — Feng-Tzer Tzeng
(74) *Attorney, Agent, or Firm* — Birch, Stewart, Kolasch & Birch, LLP

(57) ABSTRACT

A method of training an algorithm for optimizing intelligibility of speech components of a sound signal in hearing aids, headsets, etc., comprises a) providing a first database comprising a multitude of predefined time segments of first electric input signals representing sound and corresponding measured speech intelligibilities; b) determining optimized first parameters of a first algorithm by optimizing it with said predefined time segments and said corresponding measured speech intelligibilities, the first algorithm providing corresponding predicted speech intelligibilities; c) providing a second database comprising a multitude of time segments of second electric input signals representing sound, d) determining optimized second parameters of a second algorithm by optimizing it with said multitude of time segments, said second algorithm being configured to provide processed second electric input signals exhibiting respective predicted speech intelligibilities estimated by said first algorithm, said optimizing being conducted under a constraint of maximizing said predicted speech intelligibility.

20 Claims, 14 Drawing Sheets

(51) Int. Cl.

*G10L 25/84* (2013.01)
*G10L 21/0364* (2013.01)
*G10L 15/02* (2006.01)
*G10L 25/30* (2013.01)
*G10L 21/02* (2013.01)
*G10L 21/057* (2013.01)

(52) U.S. Cl.

CPC .............. *G10L 21/00* (2013.01); *G10L 21/02* (2013.01); *G10L 21/057* (2013.01); *G10L 25/30* (2013.01); *G10L 2015/025* (2013.01); *H04R 2225/43* (2013.01); *H04R 2430/03* (2013.01)

(56) References Cited

OTHER PUBLICATIONS

Spille, et al., "Predicting speech intelligibility with deep neural networks," 2017 (Year: 2017).*

Spille et al., "Predicting speech intelligibility with deep neural networks", Elsevier, Computer Speech & Language, vol. 48, 2018, pp. 51-66

Xu et al., "A Regression Approach to Speech Enhancement Based on Deep Neural Networks", IEEE/ACM Transactions on Audio, Speech, and Language Processing, vol. 23, No. 1, Jan. 2015, pp. 7-19.

* cited by examiner

METHOD OF OPERATING A HEARING DEVICE AND A HEARING DEVICE PROVIDING SPEECH ENHANCEMENT BASED ON AN ALGORITHM OPTIMIZED WITH A SPEECH INTELLIGIBILITY PREDICTION ALGORITHM

SUMMARY

The present disclosure deals with a hearing device, e.g. a hearing aid, comprising a speech enhancement unit. The speech enhancement may be based on an algorithm, e.g. a neural network. The algorithm, e.g. a neural network, may be optimized (trained) with a speech intelligibility prediction algorithm (the latter being e.g. implemented by a neural network, e.g. optimized (e.g. trained in a supervised manner) using a database of sound segments (e.g. of different length) comprising (noisy and/or processed) speech, each with an associated measured intelligibility).

A primary aim of any hearing aid system is to improve the ability of the user to understand speech. This is done by amplifying incoming sounds and by attempting to remove unwanted noise and distortion. Today's systems can do this well in quiet environments, but often fail to improve intelligibility in noisy and acoustically complex environments.

While amplification can improve intelligibility in quiet environments, it is necessary to employ high performing noise reduction and speech enhancement algorithms in noisy situations. Existing noise reduction algorithms are based on simple models of noise, and focus on removing this from a statistical viewpoint. In other words, they focus on removing the noise rather than on improving intelligibility. While these two goals may overlap, we propose that an algorithm aiming directly at intelligibility improvements will perform better at exactly that, than traditional approaches.

A speech enhancement system which processes audio signals with the direct aim of making speech more intelligible is proposed. This is done by use of neural network, e.g. deep neural network (DNN), methodology (or another machine learning methodology with similar properties). Specifically, we propose to train a DNN (i.e., find its parameters) offline, which will process a noisy and/or distorted input signal in order to maximize the signals' intelligibility. In the following, this DNN, which will eventually be executed in a hearing aid in order to process its input, is called the SE-DNN (Speech Enhancement DNN). The SE-DNN is trained in a supervised manner to optimize for speech intelligibility. Using straight-forward machine learning training methodologies, this would require a large database of listening test results, i.e., noisy/distorted speech signals, which have been evaluated by humans in intelligibility listening test results. Since such listening test databases are few and not necessarily large, we propose another approach: we propose to replace the listening test by a machine-proxy for a listening test, namely another pretrained DNN, denoted the SIP-DNN (Speech Intelligibility Prediction—DNN) in the following. The SIP-DNN has been trained offline to predict the speech intelligibility of—ideally—any noisy/processed speech signal. In summary, we propose to find the parameters of an intelligibility enhancement DNN (the SE-DNN) which maximize intelligibility as estimated by a machine-proxy for a listening test with humans, namely the speech intelligibility prediction DNN (the SIP-DNN).

Hence, as opposed to previous proposals of such processing schemes [1, 2], we train the neural network to optimize directly for estimated intelligibility. The training phase is a two-step process detailed below.

A Method of Operating Hearing Device:

In an aspect of the present application, a method of (training an algorithm for) optimizing intelligibility of speech components of a sound signal is provided. The method comprises

- providing (or providing access to) a first database (MSI) comprising
  - a multitude of predefined time segments $PDTS_i$, i=1, . . . , $N_{PDTS}$, of first electric input signals representing sound, each time segment comprising
    - a speech component representing at least one phoneme, or syllable, or word, and/or
    - a processed or filtered version of said speech component, and/or
    - a noise component, and
  - corresponding measured speech intelligibilities $P_i$, i=1, . . . , $N_{PDTS}$, of each of said predefined time segments $PDTS_i$ (e.g. measured in advance in listening test(s));
- determining optimized first parameters of a first algorithm, e.g. a first neural network (SIP-NN), by optimizing, e.g. training, it with at least some of said predefined time segments $PDTS_i$ and said corresponding measured speech intelligibilities $P_i$ of said first database (MSI), the first algorithm, e.g. the first neural network (SIP-NN), providing corresponding predicted speech intelligibilities $P_{est,i}$, said optimizing being conducted under a constraint of minimizing a cost function, e.g. a mean squared prediction error $e_i^2$ of said predicted speech intelligibilities (e.g. using an iterative stochastic gradient descent (or ascent) based method);
- providing a second database (NSIG) comprising, or otherwise providing access to, a multitude of time segments $TS_j$, j=1, . . . , $N_{TS}$, of second electric input signals representing sound, each time segment comprising
  - a speech component representing at least one phoneme, or syllable, or word, and/or
  - a processed or filtered version of said speech component, and/or
  - a noise component;
- determining optimized second parameters of a second algorithm, e.g. a second neural network (SE-NN), by optimizing, e.g. training, it with at least some of said multitude of time segments $TS_j$, where said second algorithm, e.g. the neural network (SE-NN), is configured to provide processed versions of said second electric input signals exhibiting respective predicted speech intelligibilities $P_{est,j}$ estimated by said first algorithm, e.g. the neural network (SIP-NN), said optimizing being conducted under a constraint of maximizing said predicted speech intelligibility $P_{est,j}$, or a processed, e.g. averaged, version thereof (e.g. using an iterative gradient descent (or ascent) based method).

A signal with optimized speech intelligibility may be provided based on the optimized second algorithm.

Thereby an alternative way of improving intelligibility of speech may in a hearing device may be provided.

The first database (MSI) may comprise (e.g. consist of) one set of predefined time segments $PDTS_i$, i=1, . . . , $N_{PDTS}$, where $N_{PDTS}$ is the number of predefined time segments of the database (e.g. corresponding to a single input system).

The first database (MSI) may be generated using (a multitude of) normally hearing test persons. The first database (MSI) may in general be generated for a number of different 'characteristic hearing profiles', each version of the first database being based on a multitude of test persons having substantially identical hearing capability (e.g. normally hearing or with equal hearing loss). The hearing impaired test persons of a given hearing profile, may—during test—preferably be provided with the same, e.g. linear, amplification of the input signal to compensate for the hearing impairment of that particular hearing profile. Thereby the first and second algorithms may be optimized to a particular hearing profile.

A 'speech component' may comprise a phoneme, or a syllable or a word (or a combination thereof, e.g. a sentence). A speech component need not have a meaning, but may consist of a single phoneme, or a combination of phonemes or syllables that does not have a meaning on the language in question. The important property for the 'speech intelligibility' estimation of present disclosure is whether a given (target) phoneme, syllable, word, etc. is recognized or not. The 'speech intelligibility' $P_i$ of a given time segment $PDTS_i$ is taken to include a recognition rate (e.g. between 0 and 1, or 0 and 100%) of said speech component. If e.g., a given time segment only contains noise (no (target) speech elements), a speech intelligibility (recognition rate) of 0 would be expected.

A 'processed or filtered version of a speech component', may e.g. comprise a low pass filtered version, or an amplified version, or a version having been subject to a processing algorithm (e.g. noise reduction). Such 'processed or filtered version of a speech component' (i.e. a distorted version of a 'clean' speech component) may have a lower (or higher) speech intelligibility (recognition rate) than the original (unfiltered or unprocessed) version (even though it may not contain any noise components).

The first database (MSI) may e.g. comprise two sets of predefined time segments $PDTS_{L,i}$, $PDTS_{R,i}$ of first electric input signals representing sound at respective left and right ears of a user (i=1, . . . , $N_{PDTS}$), and corresponding measured speech intelligibilities $P_i$, i=1, . . . , $N_{PDTS}$, of each of said sets of predefined time segments $PDTS_{L,i}$, $PDTS_{R,i}$. In an embodiment, the at least two sets of predefined time segments $PDTS_{i,x}$, i=1, . . . , $N_{PDTSx}$, x=1, . . . , $N_{DS}$, correspond to at least a training dataset and a test dataset, cf. e.g. 'Training data' and 'Test data' in FIG. 8, where $N_{DS}$ is the number of data sets included in the database, and $N_{PDTSx}$ is the number of time segments in a given data set (which need not be equal).

The first algorithm (cf. e.g. SIP-DNN in FIG. 2 or 3) is an algorithm which, based on noisy and/or processed speech signals, outputs an estimate of the intelligibility at a given point in time. The input to the first algorithm may, e.g., be in the form of a sequence of noisy/processed speech frames (or simply the raw noisy/processed time-domain signal samples) or corresponding magnitude spectra. The output of the first algorithm is a single (potentially time-varying) scalar, representing actual intelligibility.

The first algorithm may be implemented as a feedforward neural network (as e.g. illustrated in FIG. 9C for the second algorithm) and as described in [3]. It should be obvious, however, to a person skilled in the art that any other regression-type of computational structure may be used, which would rely on the same input (i.e. a sequence of noisy/processed input frames), provide a similar, but potentially more accurate, output (i.e., an estimate of the intelligibility), and have parameters, which are determined a priori through a training process. Such computational structures include classical machine learning tools such as Gaussian Mixture Models, Hidden Markov Models, Support Vector Machines, and obviously other tools from the area of deep learning, including convolutional neural networks (cf. e.g. [3]), recurrent networks, such as long short-term memory networks (LSTMs), etc. (cf. e.g. [4]).

The second algorithm (cf. e.g. SE-DNN in FIG. 1B or 3), takes as input a sequence of noisy/processed speech frames, and outputs a corresponding sequence of enhanced speech frames, which when converted to an output signal (e.g. using a synthesis filter bank, cf. FIG. 1B) has higher intelligibility than the noisy/processed input signal. The input to the second algorithm may be in form of a sequence of time-domain signal frames (or simply the raw noisy/processed time-domain signal samples), short-time Fourier transform (STFT) spectra (cf. FIG. 9C), STFT magnitude spectra, etc. The output of the second algorithm is a corresponding sequence of enhanced speech frames.

While the second algorithm has been described here in terms of a feedforward neural network (cf. FIG. 9C) it should be obvious to a person skilled in the art that this is merely an example. It is well-known that feedforward neural networks may be substituted by many other regression-type of computational structures, which would rely on the same input (i.e. a sequence of noisy/processed input frames), provide a similar output (i.e., an estimate of the intelligibility), and have parameters, which are determined a priori through a training process. Such other algorithms may offer advantages over feedforward neural networks in terms of reduced memory complexity, reduced computational complexity, and potentially better prediction performance.

Such 'other algorithms' may comprise (Gaussian) mixture models, hidden Markov models, machine learning methods, Support Vector Machines, convolutional neural networks, recurrent neural networks, such as long short-term memory networks (LSTMs) (cf. e.g. [4]), etc. Neural networks may e.g. comprise multi-layer perceptrons, recurrent networks (such as long, short-term memory (LSTM) networks), convolutional networks, etc. The first and/or second algorithm may be or comprise a neural network, e.g. a deep neural network. A neural network has at least one input layer and at least one output layer, each layer comprising a number of nodes defining its width. A neural network may additionally comprise a number of (so-called) hidden layers between the input and output layers, each layer exhibiting a number of nodes, each node being associated with an activation function and being connected to the nodes of the neighboring layers by branches, each branch being associated with a weight. In an embodiment, a deep neural network is defined as a neural network comprising two or more hidden layers. A deep neural network may be characterized in having a depth of more than two, e.g. more than 5, such as more than 10 hidden layers.

The number of time segments $N_{TS}$, of the second electric input signals used for training the second neural network (SE-NN) may be larger than the number $N_{PDTS}$ of predefined time segments of said first electric input signals used for training the first neural network (SIP-NN). In an embodiment, the number of time segments $N_{TS}$, of the second electric input signals is at least twice as large, such as more than ten times as large, as the number $N_{PDTS}$ of predefined time segments of said first electric input signals. The number of time segments $N_{TS}$, of said second electric input signals may be larger than 1000, e.g. larger than 10.000, such as larger than 100.000.

The training of the first and/or second algorithm(s) may comprise a random initialization and a subsequent iterative update of parameters of the algorithm in question. The training of the first and/or second algorithm(s) may comprise minimizing a cost function. The cost function may be minimized using an iterative method, e.g. a stochastic gradient descent (or ascent) approach. The cost function of the first algorithm may comprise a prediction error $e_i$, e.g. a mean squared prediction error $e_i^2$.

The predefined time segments $PDTS_i$ of the first database, which are used to train the first algorithm, e.g. the first neural network, and/or the time segments $TS_i$ of the second database, which are used to train the second algorithm, e.g. the second neural network, may be arranged to comprise a number of consecutive time frames of the time segments in question, which are fed to the first and/or to the second algorithm, respectively, at a given point in time. The number of time frames may e.g. represent a present value, and a number of time frames representing the Nh previous time frames.

The output of the first algorithm (at a given point in time) is e.g. arranged as a single value representing an estimate of the speech intelligibility of the current time segment (or of the currently processed time frames of the current time segment).

The output of the second algorithm (at a given point in time), is e.g. arranged as a single time frame of the processed second electric input signal, e.g. represented by the currently processed time frames of the current time segment. Alternatively, the output of the second algorithm (at a given point in time), may e.g. be arranged to be a number of gains configured to be applied to a current frame of the second electric input signal, so that when the gains are applied to the corresponding frame of the second electric input signal, a frame of the second processed signal is provided.

A time frame of an electric signal may e.g. comprise a number $N_s$ of consecutive samples, e.g. 64, (written as vector $x_m$) of the digitized electric signal representing sound, m being a time index, cf. e.g. FIG. 9A. A time frame of an electric signal may, however, alternatively be defined to comprise a magnitude spectrum (written as vector $X_m$) of the electric signal at a given point in time (as e.g. provided by a Fourier transformation algorithm, e.g. an STFT (Short Time Fourier Transform)-algorithm, cf. e.g. FIG. 9B. The time frame $x_m$ representing a number of time samples, and the time frame $X_m$ representing a magnitude spectrum (of the same time samples) of the electric signal are tied together by Fourier transformation, as e.g. given by the expression $X_m=\overline{F}\cdot x_m$, where $\overline{F}$ is a matrix representing the Fourier transform.

The first electric input signals representing sound, and/or said second electric input signals representing sound may each be provided as a number of frequency sub-band signals. The frequency sub-bands signals may e.g. be provided by an analysis filter bank, e.g. based a number of bandpass filters, or on a Fourier transform algorithm (e.g. by consecutively extracting respective magnitude spectra from the Fourier transformed data).

The method comprises using the optimized second algorithm in a hearing device, e.g. a hearing aid, for optimizing speech intelligibility of noisy or processed electric input signals comprising speech, and to provide optimized electric sound signals. The method may comprise providing left and right optimized electric sound signals, configured to be presented to the left and right ears of the user.

The method may comprise providing at least one set of output stimuli perceivable as sound by the user and representing processed versions of said noisy or processed electric input signals comprising speech, e.g. said optimized electric sound signals. The method may comprise providing two sets of output stimuli perceivable as sound by the user and representing processed versions of said noisy or processed electric input signals comprising speech, e.g. the left and right optimized electric sound signals, configured to be presented to the left and right ears of the user.

A Hearing Device:

In an aspect, a hearing device, e.g. a hearing aid, adapted to be worn in or at an ear of a user, and/or to be fully or partially implanted in the head of the user is provided. The hearing device comprises

- An input unit providing at least one electric input signal representing sound comprising speech components; and
- An output unit for providing at least one set of stimuli representing said sound and perceivable as sound to the user based on processed versions of said at least one electric input signal, and
- a processing unit connected to said input unit and to said output unit and comprising a second algorithm, e.g. a second neural network, optimized, e.g. trained, according to the method as described above, in the detailed description and/or in the claims to provide processed versions of said at least one electric input signal exhibiting an optimized speech intelligibility.

It is intended that some or all of the process features of the method described above, in the 'detailed description of embodiments' and/or in the claims can be combined with embodiments of the hearing device, when appropriately substituted by a corresponding structural features and vice versa. Embodiments of the hearing device have the same advantages as the corresponding methods.

The hearing device may constitute or comprise a hearing aid, a headset, an earphone, an ear protection device or a combination thereof.

In an embodiment, the hearing device is adapted to provide a frequency dependent gain and/or a level dependent compression and/or a transposition (with or without frequency compression) of one or more frequency ranges to one or more other frequency ranges, e.g. to compensate for a hearing impairment of a user. In an embodiment, the hearing device comprises a signal processor for enhancing the input signals and providing a processed output signal.

In an embodiment, the hearing device comprises an output unit for providing a stimulus perceived by the user as an acoustic signal based on a processed electric signal. In an embodiment, the output unit comprises a number of electrodes of a cochlear implant or a vibrator of a bone conducting hearing device. In an embodiment, the output unit comprises an output transducer. In an embodiment, the output transducer comprises a receiver (loudspeaker) for providing the stimulus as an acoustic signal to the user. In an embodiment, the output transducer comprises a vibrator for providing the stimulus as mechanical vibration of a skull bone to the user (e.g. in a bone-attached or bone-anchored hearing device).

In an embodiment, the hearing device comprises an input unit for providing an electric input signal representing sound. In an embodiment, the input unit comprises an input transducer, e.g. a microphone, for converting an input sound to an electric input signal. In an embodiment, the input unit comprises a wireless receiver for receiving a wireless signal comprising sound and for providing an electric input signal representing said sound.

In an embodiment, the hearing device comprises a directional microphone system adapted to spatially filter sounds from the environment, and thereby enhance a target acoustic source among a multitude of acoustic sources in the local environment of the user wearing the hearing device. In an embodiment, the directional system is adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally The generalized sidelobe canceller (GSC) structure is an equivalent representation of the MVDR beamformer offering computational and numerical advantages over a direct implementation in its original form.

In an embodiment, the hearing device comprises an antenna and transceiver circuitry (e.g. a wireless receiver) for wirelessly receiving a direct electric input signal from another device, e.g. from an entertainment device (e.g. a TV-set), a communication device, a wireless microphone, or another hearing device. In an embodiment, the direct electric input signal represents or comprises an audio signal and/or a control signal and/or an information signal. In an embodiment, the hearing device comprises demodulation circuitry for demodulating the received direct electric input to provide the direct electric input signal representing an audio signal and/or a control signal e.g. for setting an operational parameter (e.g. volume) and/or a processing parameter of the hearing device. In general, a wireless link established by antenna and transceiver circuitry of the hearing device can be of any type. In an embodiment, the wireless link is established between two devices, e.g. between an entertainment device (e.g. a TV) and the hearing device, or between two hearing devices, e.g. via a third, intermediate device (e.g. a processing device, such as a remote control device, a smartphone, etc.). In an embodiment, the wireless link is used under power constraints, e.g. in that the hearing device is or comprises a portable (typically battery driven) device. In an embodiment, the wireless link is a link based on near-field communication, e.g. an inductive link based on an inductive coupling between antenna coils of transmitter and receiver parts. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

In an embodiment, the communication between the hearing device and the other device is in the base band (audio frequency range, e.g. between 0 and 20 kHz). Preferably, communication between the hearing device and the other device is based on some sort of modulation at frequencies above 100 kHz. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology).

In an embodiment, the hearing device is a portable device, e.g. a device comprising a local energy source, e.g. a battery, e.g. a rechargeable battery.

In an embodiment, the hearing device comprises a forward or signal path between an input unit (e.g. an input transducer, such as a microphone or a microphone system and/or direct electric input (e.g. a wireless receiver)) and an output unit, e.g. an output transducer. In an embodiment, the signal processor is located in the forward path. In an embodiment, the signal processor is adapted to provide a frequency dependent gain according to a user's particular needs. In an embodiment, the hearing device comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, the hearing devices comprise an analogue-to-digital (AD) converter to digitize an analogue input (e.g. from an input transducer, such as a microphone) with a predefined sampling rate, e.g. 20 kHz. In an embodiment, the hearing devices comprise a digital-to-analogue (DA) converter to convert a digital signal to an analogue output signal, e.g. for being presented to a user via an output transducer.

In an embodiment, the hearing device, e.g. the microphone unit, and or the transceiver unit comprise(s) a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the (time-)frequency domain. In an embodiment, the frequency range considered by the hearing device from a minimum frequency $f_{min}$ to a maximum frequency $f_{max}$ comprises a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. In an embodiment, a signal of the forward and/or analysis path of the hearing device is split into a number NI of frequency bands (e.g. of uniform width), where NI is e.g. larger than 5, such as larger than 10, such as larger than 50, such as larger than 100, such as larger than 500, at least some of which are processed individually. In an embodiment, the hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

In an embodiment, the hearing device comprises a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a Smartphone), an external sensor, etc.

In an embodiment, one or more of the number of detectors operate(s) on the full band signal (time domain). In an embodiment, one or more of the number of detectors operate(s) on band split signals ((time-) frequency domain), e.g. in a limited number of frequency bands.

In an embodiment, the number of detectors comprises a level detector for estimating a current level of a signal of the forward path. In an embodiment, the predefined criterion comprises whether the current level of a signal of the forward path is above or below a given (L-)threshold value. In an embodiment, the level detector operates on the full band signal (time domain) In an embodiment, the level detector operates on band split signals ((time-) frequency domain).

In a particular embodiment, the hearing device comprises a voice detector (VD) for estimating whether or not (or with what probability) an input signal comprises a voice signal (at a given point in time). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). In an embodiment, the voice detector is adapted to detect as a VOICE also the user's own voice. Alternatively, the voice detector is adapted to exclude a user's own voice from the detection of a VOICE.

In an embodiment, the hearing device comprises an own voice detector for estimating whether or not (or with what probability) a given input sound (e.g. a voice, e.g. speech) originates from the voice of the user of the system. In an embodiment, a microphone system of the hearing device is adapted to be able to differentiate between a user's own voice and another person's voice and possibly from NON-voice sounds.

In an embodiment, the number of detectors comprises a movement detector, e.g. an acceleration sensor. In an embodiment, the movement detector is configured to detect movement of the user's facial muscles and/or bones, e.g. due to speech or chewing (e.g. jaw movement) and to provide a detector signal indicative thereof.

In an embodiment, the hearing device comprises a classification unit configured to classify the current situation based on input signals from (at least some of) the detectors, and possibly other inputs as well. In the present context 'a current situation' is taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

In an embodiment, the hearing device further comprises other relevant functionality for the application in question, e.g. compression, noise reduction, feedback cancellation, etc.

In an embodiment, the hearing device comprises a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof.

A Hearing Aid:

In an aspect, a hearing aid adapted to be worn in or at an ear of a user, and/or to be fully or partially implanted in the head of the user, and adapted to improve the user's intelligibility of speech is provided. The hearing aid comprises

- An input unit providing at least one electric input signal representing sound comprising speech components; and
- An output unit for providing at least one set of stimuli representing the sound perceivable as sound to the user, the stimuli being based on processed versions of the at least one electric input signal, and
- A processing unit connected to the input unit and to the output unit and comprising
  - a second deep neural network, which is trained in a procedure to maximize an estimate of the user's intelligibility of the speech components, and in an operating mode of operation where that second deep neural network has been trained is configured to provide a processed signal based on the at least one electric input signal or a signal derived therefrom,
- The estimate of the user's intelligibility of the speech components is provided by a first deep neural network which has been trained in a supervised procedure with predefined time segments comprising speech components and/or noise components and corresponding measured speech intelligibilities. The training is conducted under a constraint of minimizing a cost function.

The first deep neural network may be trained in an offline procedure, before the hearing aid is taken into use by the user. The minimization of a cost function may comprise a minimization of a mean squared prediction error $e_i^2$ of the predicted speech intelligibilities, e.g. using an iterative stochastic gradient descent, or ascent, based method.

The stimuli provided by the output unit to the user may be based on the processed signal from the second neural network or further processed versions thereof.

The hearing aid and/or the second neural network may be configured to be trained in a specific training mode of operation of the hearing aid, while the user is wearing the hearing aid.

Use:

In an aspect, use of a hearing device as described above, in the 'detailed description of embodiments' and in the claims, is moreover provided. In an embodiment, use is provided in a system comprising audio distribution, e.g. a system comprising a microphone and a loudspeaker. In an embodiment, use is provided in a system comprising one or more hearing aids (e.g. hearing instruments), headsets, ear phones, active ear protection systems, etc., e.g. in handsfree telephone systems, teleconferencing systems, public address systems, karaoke systems, classroom amplification systems, etc. In an embodiment, use of a hearing system comprising left and right hearing devices, e.g. configured to establish a communication link between them is provided.

A Computer Readable Medium:

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

A hearing system comprising left and right hearing devices as described above, in the detailed description and in the claims is furthermore provided by the present disclosure. The left and right hearing devices being configured to be worn in or at left and right ears, respectively, of said user, and/or to be fully or partially implanted in the head at left and right ears, respectively, of the user, and being configured to establish a wired or wireless connection between them allowing data, e.g. audio data, to be exchanged between them, optionally via an intermediate device.

In a further aspect, a hearing system comprising a hearing device as described above, in the 'detailed description of embodiments', and in the claims, AND an auxiliary device is moreover provided.

In an embodiment, the hearing system is adapted to establish a communication link between the hearing device and the auxiliary device to provide that information (e.g. control and status signals, possibly audio signals) can be exchanged or forwarded from one to the other.

In an embodiment, the hearing system comprises an auxiliary device, e.g. a remote control, a smartphone, or other portable or wearable electronic device, such as a smartwatch or the like.

In an embodiment, the auxiliary device is or comprises a remote control for controlling functionality and operation of the hearing device(s). In an embodiment, the function of a remote control is implemented in a SmartPhone, the SmartPhone possibly running an APP allowing to control the functionality of the audio processing device via the SmartPhone (the hearing device(s) comprising an appropriate wireless interface to the SmartPhone, e.g. based on Bluetooth or some other standardized or proprietary scheme).

In an embodiment, the auxiliary device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

In an embodiment, the auxiliary device is or comprises another hearing device.

The hearing system may comprise left and right hearing devices as described above, in the detailed description and in the claims. The left and right hearing devices are configured to be worn in or at left and right ears, respectively, of said user, and/or to be fully or partially implanted in the head at left and right ears, respectively, of the user.

In an embodiment, the hearing system comprises two hearing devices adapted to implement a binaural hearing system, e.g. a binaural hearing aid system. The first and second hearing aid devices may comprise transceiver circuitry allowing a communication link to be established between them (possibly via a third intermediate device).

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. In an embodiment, the APP is configured to run on cellular phone, e.g. a smartphone, or on another portable device allowing communication with said hearing device or said hearing system.

Definitions:

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating electronically with each other. The loudspeaker may be arranged in a housing together with other components of the hearing device, or may be an external unit in itself (possibly in combination with a flexible guiding element, e.g. a dome-like element).

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. a multi-electrode array for electrically stimulating the cochlear nerve).

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system), and used by a processing algorithm executed by the configurable signal processing circuit of the hearing device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. SmartPhones), or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. karaoke) systems, teleconferencing systems, classroom amplification systems, etc.

Embodiments of the disclosure may e.g. be useful in applications such as hearing aids, headsets, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids.

In the following, a single-microphone system is used to exemplify the concepts of the present disclosure. Multi-microphone systems (as outlined in slightly more detail below) are straightforward generalizations of the single-microphone system.

Figure 1A:
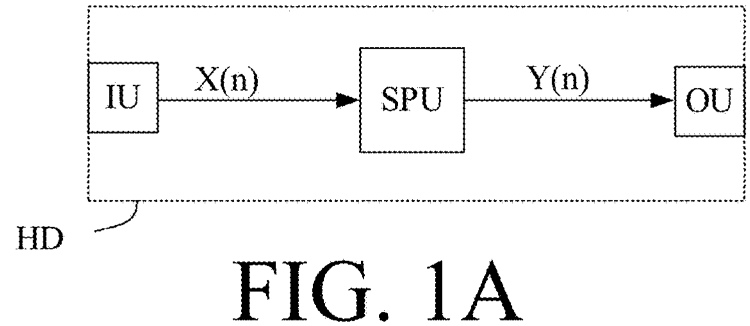
FIG. 1A illustrates a hearing device according to an embodiment of the present disclosure, the hearing device comprising a forward path comprising an input unit, a signal processor and an output unit, wherein the signal processor is configured to execute an algorithm for enhancing an intelligibility of the electric input signal before it is presented to the user via the output unit.

FIG. 1A shows a hearing device (HD) according to an embodiment of the present disclosure. The hearing device (HD) comprises a forward path comprising an input unit (IU), a signal processor (SPU) and an output unit (OU), wherein the signal processor (SPU) is configured to execute an algorithm for enhancing an intelligibility of the electric input signal X(n) before it is presented to the user via the output unit (OU). The signal processor (SPU) may process the electric input signal X(n) in the time domain and provide the processed signal Y(n) (preferably exhibiting an improved intelligibility of speech components), which is presented to the user as stimuli perceivable as sound. The input unit may comprise an input transducer (e.g. a microphone), and may further comprise an analogue to digital converter to provide the electric input signal X(n) as a digital signal. The output unit (OU) may comprise an output transducer, e.g. a vibrator or a bone conduction hearing device, or a loudspeaker of an air conduction hearing device. Alternatively (or additionally), the output unit may comprise a multi-electrode array of a cochlear implant hearing device adapted for electrically stimulating a hearing nerve of the user.

Figure 1B:
FIG. 1B illustrates a forward path of a hearing device according to an embodiment of the present disclosure, wherein the forward path comprises a filter bank allowing the signal processor comprising a neural network configured to enhance an intelligibility of the electric input signal to operate in the (time-) frequency domain.

FIG. 1B illustrates a forward path of a hearing device according to an embodiment of the present disclosure, wherein the forward path comprises a filter bank allowing the signal processor comprising a neural network configured to enhance an intelligibility of the electric input signal to operate in the (time-) frequency domain.

The input signal to the system, X(n), where n is a time index, may be a noisy or otherwise degraded speech signal, i.e. a typical hearing aid input signal. This signal may be analyzed with a filter bank (cf. Analysis filterbank in FIG. 1B), or a similar analysis structure. The resulting time-frequency coefficients are denoted as $x_{k,m}$, k=1, . . . , K, and m=1, . . . , M, where k is the frequency band index and m is the time frame index. The coefficients of one time frame (and possibly coefficients from earlier and/or later time frames—these generalizations are not shown in the figure), are passed through a neural network for speech enhancement (cf. SE-DNN in FIG. 1B). The SE-DNN processes the input and outputs enhanced time-frequency coefficients $y_{k,m}$, k=1, . . . , K, and m=1, . . . , M, (or any other abstraction of an enhanced speech signal), which can be synthesized (cf. Synthesis filterbank in FIG. 1B) into an audio signal Y(n). The aim of the neural network is to process the input signal, X(n), such as to improve its intelligibility to either normal hearing or hearing impaired listeners. To do so, the SE-DNN is trained as described below.

Training of the Proposed System

Figure 2:
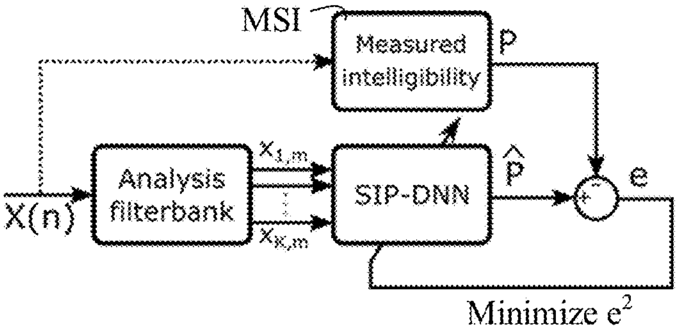
FIG. 2 illustrates a scheme for training of a Speech Intelligibility Prediction (SIP) unit based on a Neural Network (NN), as proposed in the present disclosure.
Figure 3:
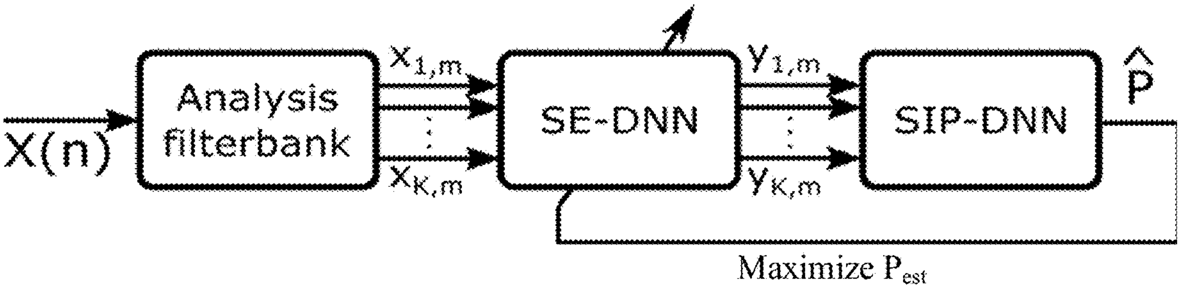
FIG. 3 illustrates an embodiment of the proposed system for training a neural network for speech intelligibility enhancement, FIG. 4A schematically shows a scenario for generating a first database of measured speech intelligibilities for a binaural hearing system according to the present disclosure, and FIG. 4B schematically shows a system for training a first neural network with binaural data having predefined time segments representing a mixture of speech noise and corresponding measured speech intelligibilities of the first database (Bin-MSI) as shown in FIG. 4A, the first neural network providing corresponding estimated speech intelligibilities, while minimizing a prediction error, thereby providing a first optimized (trained) neural network (Bin-SIP-NN*)

The proposed system is trained in two stages as illustrated in exemplary embodiments of FIGS. 2 and 3.

1) A neural network for predicting speech intelligibility (SIP-DNN) is trained using a database of measured intelligibility P (cf. unit Measured intelligibility in FIG. 2), i.e., the result of a listening test involving human subjects, along with the stimuli of the listening test. The SIP-DNN parameters/weights are initialized randomly. The SIP-DNN is then trained (in that appropriate parameters/weights are determined algorithmically) using a database of measured intelligibility values (i.e. a database containing noisy/distorted/processed speech signals and corresponding measured intelligibility values, e.g. in percentages of correctly understood words). This is done iteratively by use of an iterative procedure (e.g. (iterative) stochastic gradient descent (or ascent)) such as to minimize a cost function, e.g. the prediction error (or the squared prediction error). The input to the SIP-DNN is a noisy or degraded speech signal X(n) (e.g. provided in a time frequency representation by Analysis filterbank as a number K of frequency sub-band signals $X_{1,m}$, . . . , $X_{K,m}$, where K is the number of frequency sub-bands and m is a time index), and the output is a prediction $\hat{P}$ of the intelligibility of the input signal X(n), measured e.g. as a percentage of correctly understood words (or syllables or other linguistic elements). The (adaptive) training process for the SIP-DNN is illustrated in FIG. 2, where the SIP-DNN is fed with a comparison measure, or cost function, (e.g. the squared difference) e between a measured P speech intelligibility provided by the Measured Intelligibility database and an estimated $\hat{P}$ speech intelligibility provided by the neural network SIP-DNN. Such a system is described in [3], which is incorporated herein by reference (and referred to for further details). The (trained) SIP-DNN is assumed to be a reliable estimator of intelligibility within all considered acoustical environments and for all types of degradation (e.g. types of noise (e.g. its spectro-temporal and/or spatial distribution), signal-to-noise ratios (SNR), etc.) or processing (e.g. beamforming and/or other noise reduction) applied to the signals of interest. The estimated speech intelligibility $\hat{P}$ is e.g. based on data representing a certain time segment of the input signal, e.g. comprising a minimum number of time frames, e.g. corresponding to more than 100 ms of the electric input signal such as more than 0.5 s, such as of the order of 1 s (or more). The minimum value of the length of time segments of the electric input signal on which to base an estimated speech intelligibility $\hat{P}$ is related to the basic building blocks of speech, e.g. syllables, words, sentences (or the like).

2) The trained SIP-DNN is, in turn, used as a proxy for real listening tests (see [3] for details), to train the SE-DNN. This is done as shown in FIG. 3. A database of noisy/distorted speech signals is used for this. It is important to notice that this database does not have to include the corresponding values of measured intelligibility, as these are simply estimated using the SIP-DNN (in other words, this database does not require additional listening tests to be conducted). Hence, this database can be generated offline, and can in principle be much larger than the database of intelligibility test results used to train the SIP-DNN—from a practical perspective, this is big advantage, because large training databases are necessary to train large DNNs robustly. In order to train the SE-DNN (i.e. to determine the values of its weights), the SE-DNN may be randomly initialized and may thereafter be updated iteratively. This is done by using numerical optimization methods such as e.g. (iterative) stochastic gradient descent (or ascent). An advantage of this approach is the observation that, because both the SE-DNN and the SIP-DNN are neural networks and in turn differentiable, gradient steps can be applied to the SE-DNN such as to increase predicted intelligibility, $\hat{P}$. The result is a neural network, SE-DNN, which can increase predicted intelligibility.

Generalizations:

The description above involves training of a single-microphone system, the SE-DNN, for speech intelligibility enhancement (see, e.g. FIG. 1A, 1B, 2, 3). However, the presented idea can straight-forwardly be extended to a multi-microphone situation. To do so, consider the training scheme in FIG. 3 for finding the parameters of the SE-DNN, but extended for multiple inputs, $X_1(n), \ldots, X_M(n)$, where $M \geq 2$ denotes the number of microphones/sensors. In this situation, an analysis filter bank would be applied to each of the M microphone signals. The resulting time-frequency coefficients would then be input to an extended, multi-microphone SE-DNN. As before, the output of this multi-microphone SE-DNN would still be the time-frequency coefficients of a single intelligibility enhanced signal (see e.g. FIG. 5C). The training (i.e. determination of the parameters of) the extended SE-DNN would be conducted exactly as for the single-microphone situation sketched in FIG. 3 (cf. e.g. FIG. 5A, 5B): Numerical methods such as stochastic gradient-descent (or ascent) would be applied to determine the weights of the extended SE-DNN, which would be optimal for a large range of different input signals (different speech signals, speakers, speaker locations, noise types, spatial noise distributions, signal-to-noise ratios (SNRs), etc.).

In a similar manner, the proposed scheme can straight-forwardly be extended to a system with binaural outputs (i.e., systems with two, a left and a right, outputs, $Y_L(n)$ and $Y_R(n)$, cf. FIG. 4A, 4B, 4C, 4D, 4E).

Furthermore, in a similar manner, the proposed scheme may be applied to other aspects of speech signals than speech intelligibility. For example, one could envision a listening effort predictor based on neural networks (LEP-DNN) and the training of a speech enhancement neural network (SE-DNN) which minimizes listening effort.

Figure 4A:
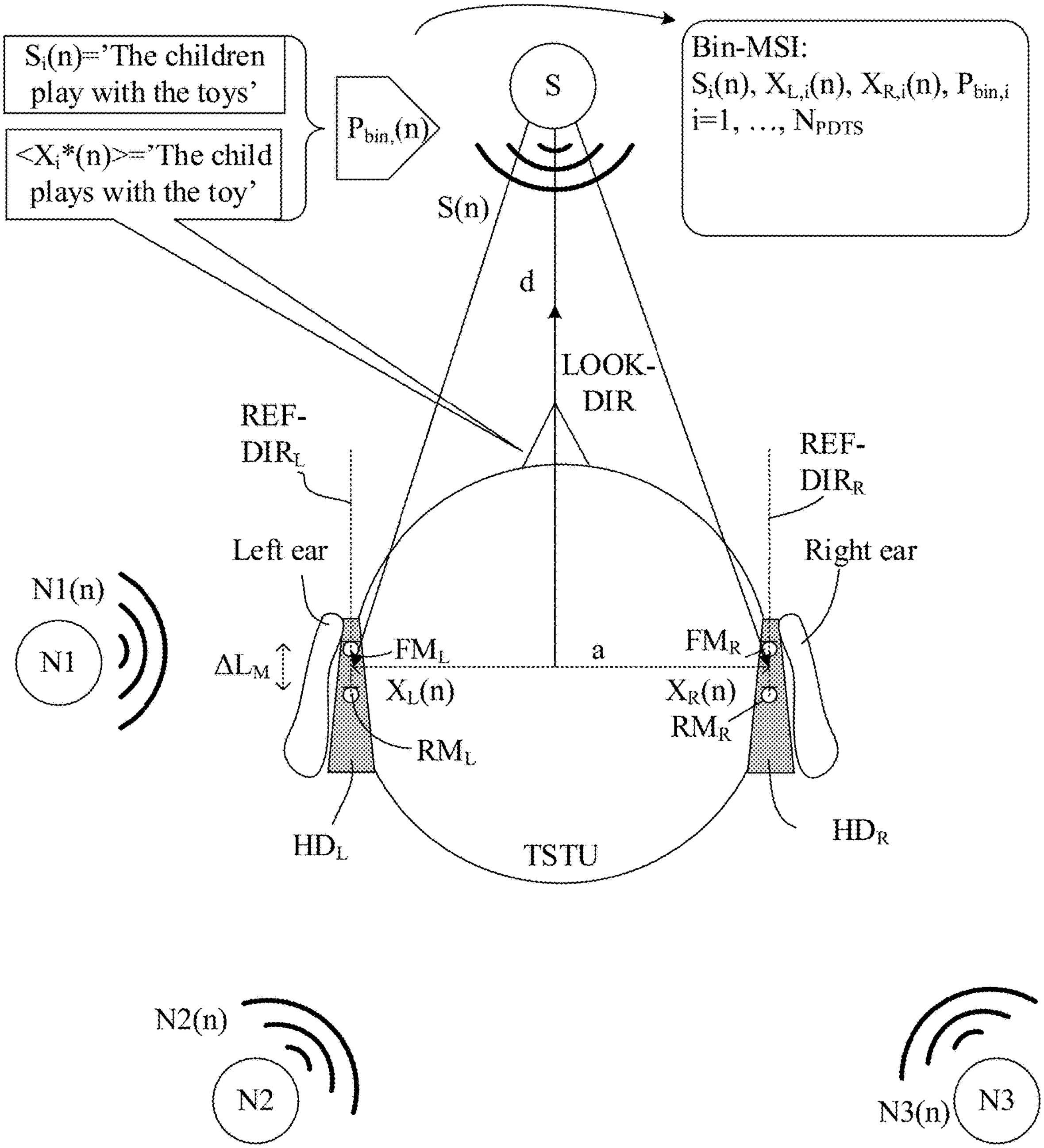
FIG. 4C schematically illustrates a system for training a second neural network with binaural data comprising (arbitrary) noisy time segments representing left and right electric input signals, determining optimized second weights of a second neural network (Bin SE-NN), while maximizing a speech intelligibility $P_{bin,est}$, estimated by the first optimized (trained) neural network (Bin-SIP-NN*), where the second neural network (Bin-SE-NN) is configured to provide modified left and right electric input signals exhibiting an improved speech intelligibility, thereby providing a second optimized (trained) neural network (Bin-SE-NN*)
FIG. 4D schematically illustrates a first embodiment of a binaural hearing system comprising a second optimized (trained) neural network (Bin-SE-NN*) according to the present disclosure.
FIG. 4E schematically illustrates a second embodiment of a binaural hearing system comprising left and right hearing devices, and a second optimized (trained) neural network (Bin-SE-NN*) according to the present disclosure, where the speech intelligibility enhancement is performed in a separate auxiliary device, FIG. 5A schematically shows a system for training a first neural network with multi-input data having predefined time segments representing a mixture of speech noise and corresponding measured speech intelligibilities of the first database (MM-MSI), the first neural network providing corresponding estimated speech intelligibilities, while minimizing a prediction error, thereby providing a first optimized (trained) neural network (MM-SIP-NN*)

FIG. 4A shows a scenario for (a listening test) generating a first database (Bin-MSI) of measured speech intelligibilities for a binaural hearing system according to the present disclosure. A (e.g. normally hearing) test user (TSTU) is exposed to a listening test, where a number ($N_{PDTS}$) of predefined time segments $PDTS_i$, $i=1, \ldots, N_{PDTS}$, each comprising a speech component (S(n), e.g. a sentence) representing a multitude of syllables and/or words (from target sound source S, e.g. a loudspeaker, or a person) is mixed with a noise component (from noise sources N1, N2, N3, e.g. from respective loudspeakers or real noise sources). The user is asked to repeat the contents of the time segment (e.g. a sentence), which is compared to the (predefined) contents of the time segment and corresponding (measured) speech intelligibilities $P_{bin}$, $i=1, \ldots, N_{PDTS}$, of each of said predefined time segments $PDTS_i$ of an electric input signal are determined. The exemplary predefined sentence $S_i(n)$='The children play with the toys' as received and interpreted by user is interpreted as <Xi*(n)>='The child plays with the toy', and a corresponding intelligibility measure $P_{bin,i}$ is determined. The mixture of the target signal (S(n)) and the noise signals (N1(*n*), N2(*n*), N3(*n*)) as received by the left and right hearing devices ($HD_L$ and $HD_R$) are recorded as $X_L(n)$, $X_R(n)$, respectively (e.g. by ear pieces comprising one or more microphones, here two are shown, in the form of respective front ($FM_L$, $FM_R$) and rear ($RM_L$, $RM_R$) microphones of behind the ear (BTE) parts of at the left and right hearing devices). The sound source S is located in front of the test person in a look direction (LOOK-DIR), a known distance d from the user.

By varying the spatial arrangement of the sound source S and the noise sources N and their mutual loudness (relative output levels) in different relevant setups (providing different signal to noise ratios), a large number of data is preferably recorded. By spatially rearranging the sound source relative to the user, and recording data at the different locations (e.g. to the side(s), to rear, etc.), training data for relevant acoustic situations are picked up. By varying the types of noise (e.g. noise having different spectro-temporal distributions) provided by the noise source(s), relevant acoustic environments can be emulated, e.g. car noise, flight noise, babble, etc.

In case of a multi microphone situation, as illustrated in FIG. 5A-5D, and FIG. 6A-6D, where processing of the multitude of electric input signals of a given hearing device is present, before an estimate of speech intelligibility of a signal resulting from the processing is provided, it is also of interest to include different processing configurations in the training data (e.g. using different programs, or different parameters of a program).

In the example above, the first database (Bin-MSI) was indicated to be generated using normally hearing test persons. The first database (MSI) may in general be generated for a number of different 'characteristic hearing profiles' (e.g. for different groups of substantially equal audiograms), i.e. each version of the first database being based on a multitude of test persons having substantially identical hearing capability (e.g. normally hearing or with equal hearing loss). In case of hearing impaired test persons of a given hearing profile, it is assumed that during test they are all provided with the same linear amplification of the input signal (i.e. providing a level independent but frequency dependent hearing compensation of the hearing loss in question).

Figure 4B:
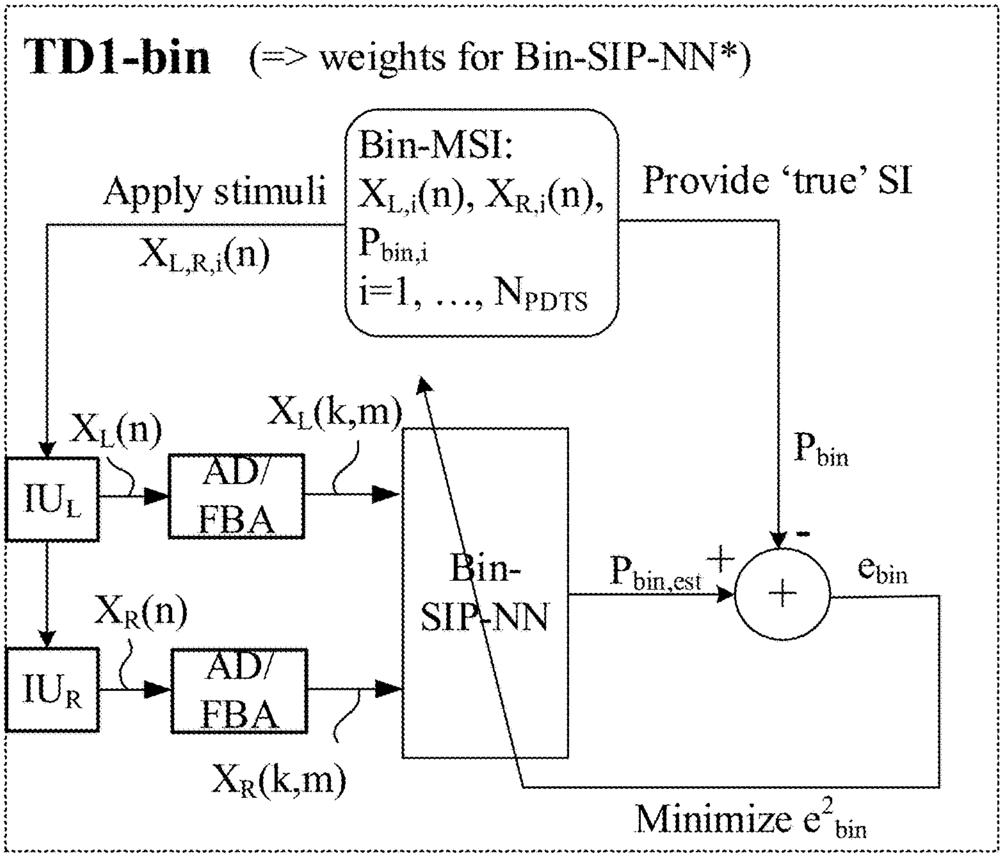

FIG. 4B schematically shows a system (TD1-bin) for training a first neural network (Bin-SIP-NN) with binaural data $X_L(n)$, $X_R(n)$ having predefined time segments representing a mixture of speech noise and corresponding measured speech intelligibilities $P_{bin}$ of the first database (Bin-MSI) as shown in FIG. 4A. The first neural network provides corresponding estimated speech intelligibilities $P_{bin,est}$, while minimizing a prediction error $e_{bin}$, thereby providing a first optimized (trained) neural network (Bin-SIP-NN*). The method of optimizing the neural network (Bin-SIP-NN) is similar to the method described above, e.g. in relation to FIG. 2 for the monaural situation. Binaural (time domain) stimuli $X_{L,i}(n)$, $X_{R,i}(n)$ from the database Bin-MSI are provided to respective left and right input units ($IU_L$, $IU_R$). The time segments are converted to frequency sub-band signals $X_{L,i}(k,m)$ and $X_{R,i}(k,m)$ by respective analysis filter banks (FBA), here indicated to include analogue to digital conversion (AD) ((if not provided elsewhere). Index i for time segment i (or training data i) has been omitted in the input part of FIG. 4B (and likewise in subsequent drawings). frequency sub-band signals $X_{L,i}(k,m)$ and $X_{R,i}(k,m)$ are fed to the first neural network (Bin-SIP-NN) which estimates a speech intelligibility $P_{est,bin}$ (for the $i^{th}$ data set) based thereon. The estimated is speech intelligibility $P_{est,bin}$ compared the measured speech intelligibility $P_{bin}$ (cf. indication Provide 'true' SI on signal from the data base Bin-MSI to the combination unit '+') in sum unit '+' providing a corresponding prediction error $e_{bin}$. The (possibly averaged, and/or squared) prediction error is minimized in an iterative procedure where parameters of the neural network Bin-SIP-NN are modified (e.g. according to a steepest decent procedure) as further discussed in connection with FIG. 8.

Figure 4C:
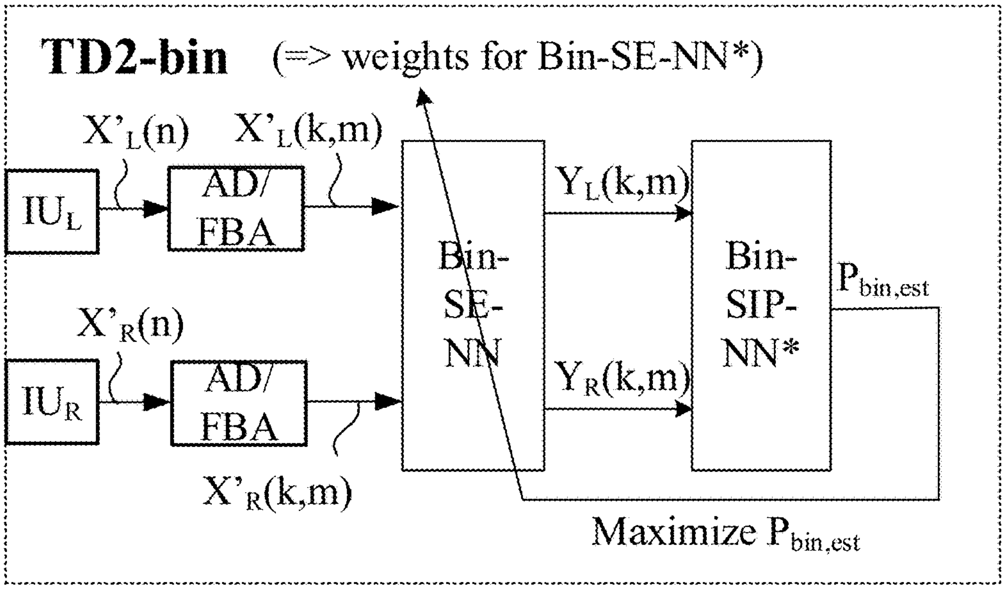

FIG. 4C schematically illustrates a system (TD2-bin) for training a second neural network (Bin-SE-NN) with binaural data comprising (arbitrary) noisy time segments representing left and right electric input signals $X'_L(n)$ and $X'_R(n)$, determining optimized second weights of a second neural network (Bin-SE-NN), while maximizing a speech intelligibility $P_{bin,est}$, estimated by the first optimized (trained) neural network (Bin-SIP-NN*) based on modified left and right electric input signals $Y_L(k,m)$ and $Y_R(k,m)$ provided by the second neural network (Bin-SE-NN). Thereby a second optimized (trained) neural network (Bin-SE-NN*) is provided. The training data $X'_L(n)$ and $X'_R(n)$ may be stored in a database and loaded into the input units in subsequent batches (e.g. controlled by a control unit) or be picked up by the input units, e.g. corresponding microphones. The training data $X'_L(n)$ and $X'_R(n)$ are converted to the time-frequency domain $X'_L(k,m)$ and $X'_R(k,m)$ by respective analysis filter banks (and prior to that digitized, e.g. stored in a database on digitized form or digitized in the respective input units). The database may be stored in the training system TD2-bin (or be accessible from the training system, e.g. via a wired or wireless link). The training system TD2-bin may form part of a hearing device according to the present disclosure.

Figure 4D:
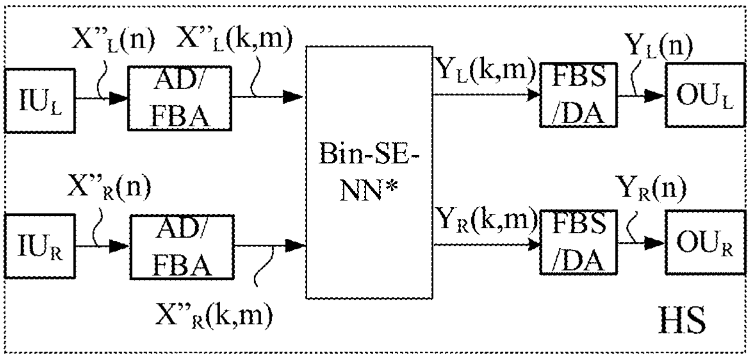

FIG. 4D schematically illustrates a first embodiment of a binaural hearing system (HS) comprising a second optimized (trained) neural network (Bin-SE-NN*) according to the present disclosure. The hearing system comprises left and right input units adapted for being located at or in left and right ears of a user to pick up left and right electric input signals $X''_L(n)$ and $X''_R(n)$, respectively. The time domain signals $X''_L(n)$ and $X''_R(n)$ are converted to respective frequency sub-band signals $X''_L(k,m)$ and $X''_R(k,m)$ by respective analysis filter banks (FBA), e.g. including analogue to digital conversion units (AD) (if not provided elsewhere). The second optimized (trained) neural network (Bin-SE-NN*) provides enhanced left and right electric input signals $Y_L(k,m)$ and $Y_R(k,m)$ with optimized speech intelligibility with are fed to respective analysis filter banks (FBS) and optional digital to analogue converters (DA). The resulting left and right time domain output signals $Y_L(n)$ and $Y_R(n)$, are fed to output units $OU_L$ and $OU_R$, respectively, for presentation to the user wearing the hearing system.

The binaural hearing system (HS) may be configured in a number of different ways, including partitioned in a number of separate devices in communication with each other. One such solution is schematically illustrated in FIG. 4E.

Figure 4E:
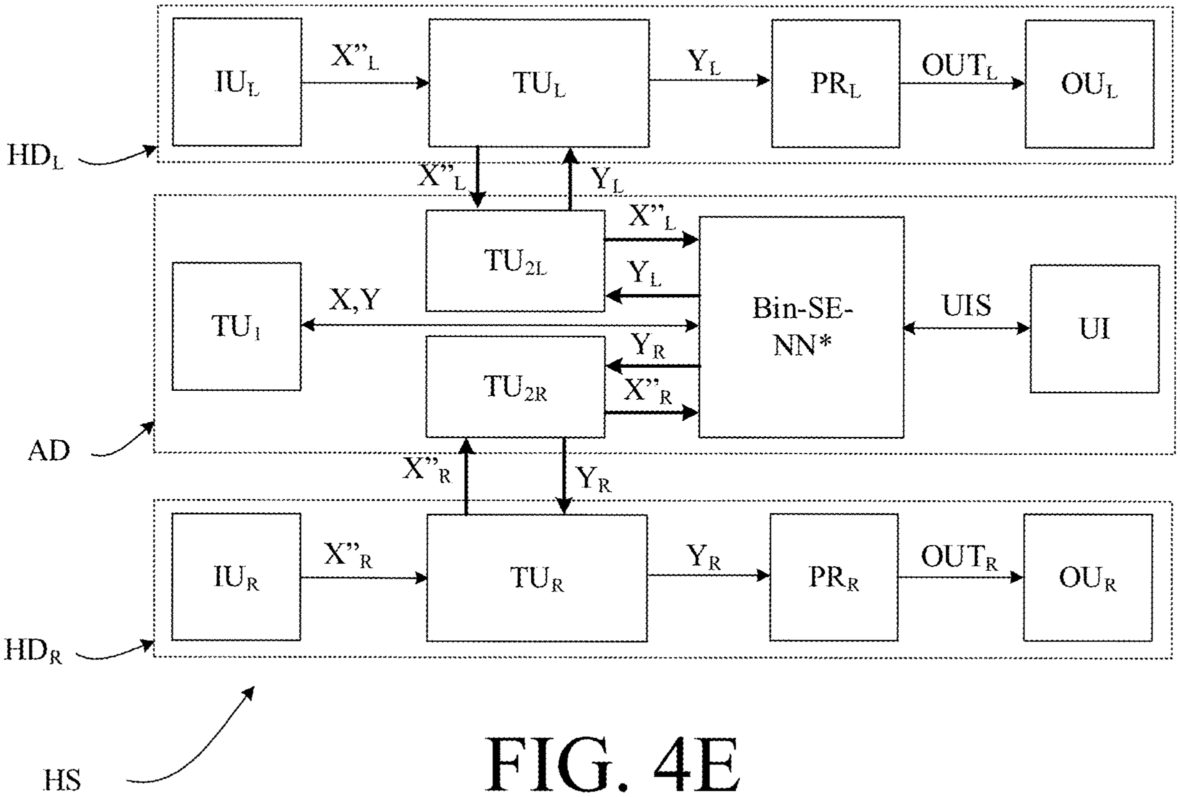

FIG. 4E schematically illustrates a second embodiment of a binaural hearing system (HS) comprising left and right hearing devices ($HD_L$, $HD_R$), and a second optimized (trained) neural network (Bin-SE-NN*) according to the present disclosure, where the speech intelligibility enhancement is performed in a separate auxiliary device (AD). The hearing system is configured to allow communication between left and right hearing devices ($HD_L$, $HD_R$) and the auxiliary device (AD). The auxiliary device (AD) and the left and right hearing devices ($HD_L$, $HD_R$) comprises respective transceivers (TU2L, TU2R in AD, and $TU_L$ and $TU_R$ in $HD_L$, $HD_R$, respectively) allowing the exchange of one or more audio signals between them. The left and right hearing devices ($HD_L$, $HD_R$) additionally comprises input units ($IU_L$, $IU_R$) providing respective noisy left and right electric input signals $X''_L$ and $X''_R$, and output units ($OU_L$, $OU_R$) for providing stimuli perceivable as sound to the user's left and right ears based on respective processed left and right output signals $OUT_L$, $OUT_R$. The left and right hearing devices ($HD_L$, $HD_R$) may be mere ear pieces comprising only input and output units and all processing is performed in the auxiliary device. In the embodiment of FIG. 4E, however, the left and right hearing devices ($HD_L$, $HD_R$) additionally comprises respective processors ($PR_L$, $PR_R$), e.g. for applying one or more processing algorithms to the respective enhanced input signals $Y_L$, $Y_R$ (e.g. for applying a frequency and/or level dependent gain (e.g. attenuation) to the enhanced signal to compensate for the user's hearing impairment).

In addition to the transceivers for receiving noisy input signals $X''_L$ and $X''_R$ from and for delivering enhanced input signals $Y_L$ and $Y_R$ to the left and right hearing devices ($HD_L$, $HD_R$), respectively, the auxiliary device (AD) comprises the speech intelligibility enhancement unit (Bin-SE-NN*) according to the present disclosure. The speech intelligibility enhancement unit is connected to user interface UI (e.g. a touch sensitive display) via signals UIS (e.g. for displaying relevant information to the user regarding current acoustic environments and speech intelligibility and for allowing the user to influence the hearing system, e.g. the configuration of the speech intelligibility enhancement unit. The auxiliary device also comprises a further transceiver unit TU1, e.g. or communicating with another device or a network (e.g. a telephone or data network).

In FIG. 4E, the processing (including the optimized neural network Bin-SE-NN*) of the electric input signals to improve speech intelligibility is performed in a separate auxiliary device (AD). This processing may be located fully or partially in one of the left and right hearing devices ($HD_L$, $HD_R$) when appropriately modified to allow transmission of electric input signals (e.g. $X''_L$) from a first one (e.g. $HD_L$) of the hearing devices to the other (processing) hearing device (e.g. $HD_R$) and to allow a resulting enhanced electric signal (e.g. $Y_L$) with improved intelligibility to be transmitted back to the first hearing device (e.g. $HD_R$). In an embodiment, the processing is fully or partially performed on a server accessible to the hearing device or hearing system, e.g. via a network (e.g. located 'in the cloud').

Figure 5A:
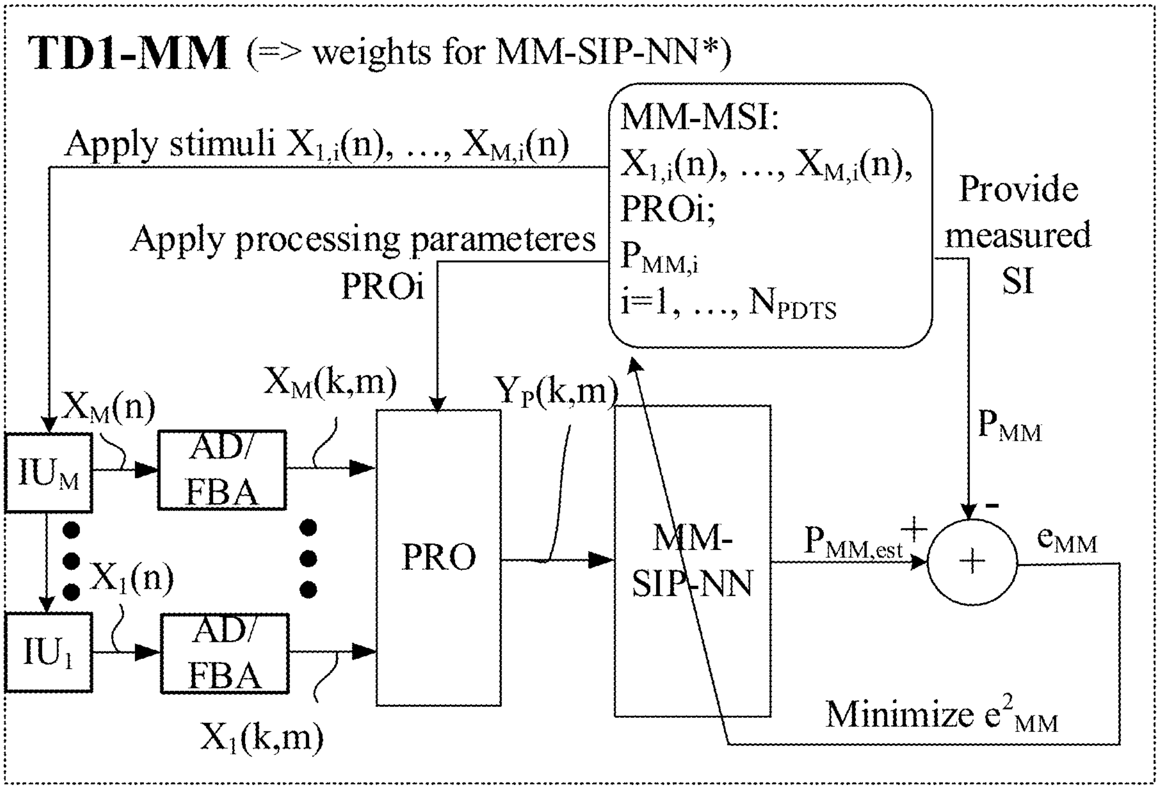
FIG. 5B schematically shows a system for training a second neural network with data comprising (arbitrary) noisy time segments representing a multitude of electric input signals picked up at different locations at or around a user, thereby determining optimized second weights of a second neural network (MM-SE-NN), while maximizing a speech intelligibility $P_{MM,est}$, estimated by a first optimized (trained) neural network (MM-SIP-NN*)
FIG. 5C schematically shows a first embodiment of a hearing device comprising a multitude of input units and a second optimized (trained) neural network (MM-SE-NN*) according to the present disclosure.
FIG. 5D schematically shows a second embodiment of a hearing device comprising a multitude of input units, a beamformer and a second optimized (trained) neural network (SE-NN*) according to the present disclosure, FIG. 6A schematically shows a system for training a first neural network with multi-input, binaural data having predefined time segments representing a mixture of speech noise and corresponding measured speech intelligibilities of the first database (MM-Bin-MSI), the first neural network providing corresponding estimated speech intelligibilities, while minimizing a prediction error, thereby providing a first optimized (trained) neural network (MM-Bin-SIP-NN*)

FIG. 5A shows a system (TD1-MM) for training a first neural network (MM-SIP-NN) with multi-input data comprising predefined time segments representing a mixture of speech and noise (cf. 'Apply stimuli $X_{1,i}(n), \ldots, X_{M,i}(n)$' in FIG. 5A) and corresponding measured speech intelligibilities (cf. 'Provide measured SI' in FIG. 5A) stored in the first database (MM-MSI). The first neural network (MM-SIP-NN) provides corresponding estimated speech intelligibilities $P_{MM,est}$, while minimizing a prediction error $e_{MM}$, (or rather the squared prediction error $e^2_{MM}$), cf. 'Minimize $e^2_{MM}$' in FIG. 5A. Thereby a first optimized (trained) neural network (MM-SIP-NN*) is provided. Compared to the system of FIG. 2, the system TD1-MM of FIG. 5A comprises M input units $IU_1, \ldots, IU_M$ (instead of one), where $M \geq 2$. Each of the multitude of corresponding input signals $X_1(n), \ldots, X_M(n)$ are converted to a time frequency representation $X_1(k,m), \ldots, X_M(k,m)$ by respective analysis filter banks (AFB) (and possible analogue to digital conversion (AD) circuitry (if not provided elsewhere in the system). The multitude of electric input signals $X_1(k,m), \ldots, X_M(k,m)$ are fed to processor (PRO) for generating a single processed electric input signal $Y_P(k,m)$, which is used as input to the first trainable neural network MM-SIP-NN. The processor may apply relevant processing algorithms to the multitude of electric input signals, e.g. beamforming for providing a combination (e.g. a linear combination, e.g. a weighted sum) of the input signals. The relevant processing algorithms may also comprise noise reduction, e.g. dereverberation. To include a variation of the processing in the training data, a number of relevant processing parameter variations (cf. 'Apply processing parameters PROi' in FIG. 5A) are included in addition to the previously mentioned variations of spatial configuration of target sound source and noise, types of noise, etc.

Alternatively, a multitude of time segments of the processed signal $Y_{P,i}$ may be stored together with corresponding measured speech intelligibilities $P_{MM,i}$, in the first database MM-MSI, where the time segments of $Y_{P,i}$ are generated for a multitude of values of the M electric input signals (and types of noise, and mutual spatial configurations of target and noise sound sources), and a variety of processing conditions. Thereby a reduced number of data has to be stored in the database, and only the resulting processed signal ($Y_{P,i}$) has to be fed from the database to to the first neural network (MM-SIP-NN).

Figure 5B:
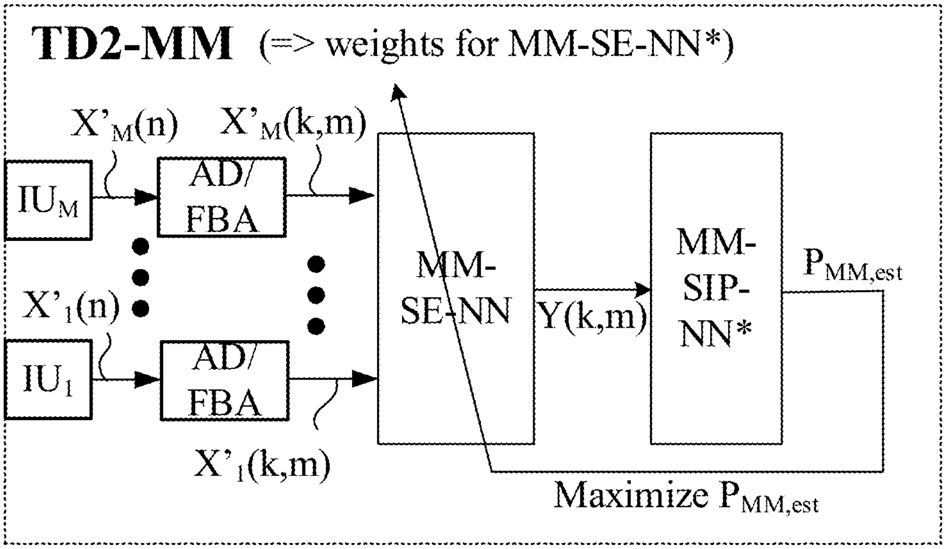

FIG. 5B schematically shows a system (TD2-MM) for training a second neural network (MM-SE-NN) with data comprising (arbitrary) noisy time segments representing a multitude of electric input signals $X'_1(n), \ldots, X'_M(n)$ ($X'_1k,m), \ldots, X'_M(k,m)$) picked up at different locations at or around a user (e.g. in one and the same hearing device, e.g. located at or in an ear of the user), thereby determining optimized second weights $w_{opt}$ of the second neural network (MM-SE-NN), while maximizing a speech intelligibility $PMM_{,est}$, estimated by the first optimized (trained) neural network (MM-SIP-NN*) (cf. 'Maximize $P_{MM,est}$' in FIG. 5B). The determination of optimized second weights $w_{opt}$ of the second neural network (MM-SE-NN) is in principle equivalent to the determination of optimized second weights $w_{opt}$ of the second neural networks (SE-DNN and Bin-SE-NN) described above in connection with FIG. 3 and FIG. 4C, respectively.

Figure 5C:
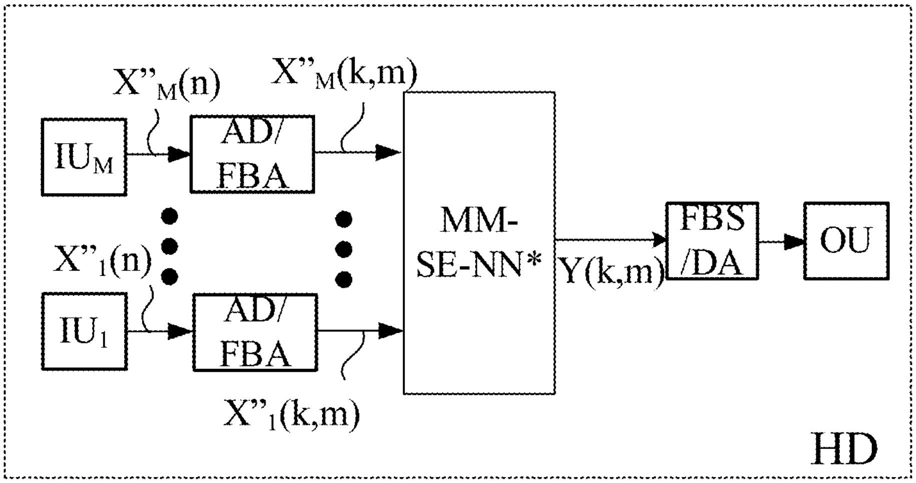

FIG. 5C schematically shows a first embodiment of a hearing device (HD) comprising a multitude of input units ($IU_1, \ldots, IU_M$) for providing corresponding noisy electric input signals $X''_1(n), \ldots, X''_M(n)$, each being converted to the time-frequency domain by analysis filter banks FBA, cf. signals $X''_1(k,m), \ldots, X''_M(k,m)$, which are fed to second optimized (trained) neural network (MM-SE-NN*) according to the present disclosure. The embodiment of FIG. 5C is similar to the embodiment of FIG. 1B. The difference is that the embodiment of FIG. 5C comprises more than one input unit, and hence more than one input signal to the optimized neural network. The second optimized (trained) neural network (MM-SE-NN*) provides enhanced electric input signal Y(k,m) with improved speech intelligibility. This signals is fed to synthesis filter bank FBS (and optional digital to analogue (DA) conversion circuitry) to provide a corresponding time domain signal for presentation to the user via output unit OU, e.g. a vibrator of a bone anchored hearing aid or a loudspeaker of hearing device, e.g. an air conduction hearing aid.

Figure 5D:
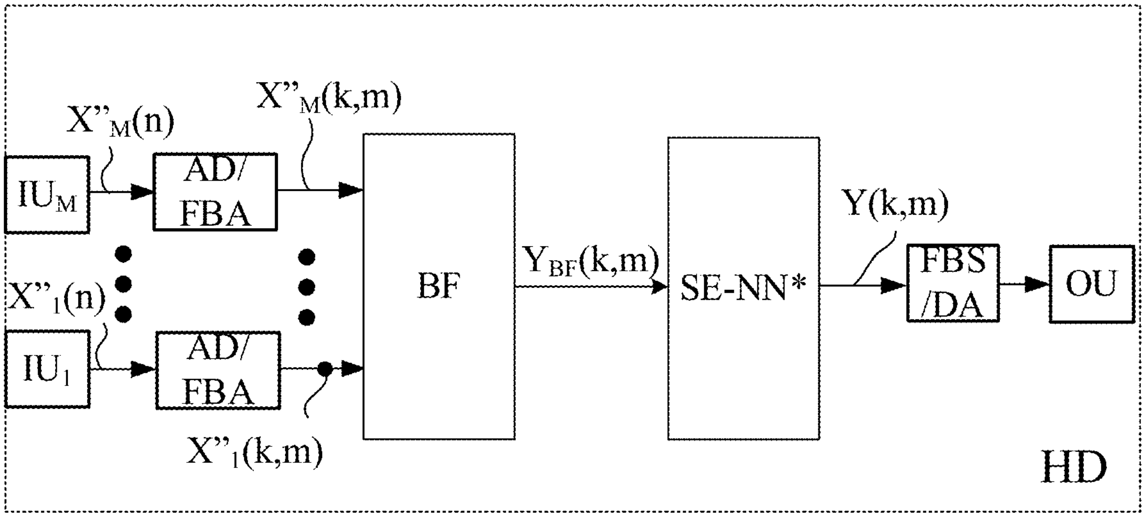

FIG. 5D schematically shows a second embodiment of a hearing device (HD) comprising a multitude of input units ($IU_1, \ldots, IU_M$), as described in connection with FIG. 5C. The difference of the embodiment of FIG. 5D is that it comprises processor (here a beamformer (BF) for providing a single (beamformed) signal from the multitude of electric input signals $X''_1(k,m), \ldots, X''_M(k,m)$. The processed (beamformed) signal $Y_{BF}(k,m)$ is fed to a second optimized (trained) neural network (SE-NN*) according to the present disclosure. This is e.g. trained as suggested in connection with the single input system of FIG. 3 (but where training data for the network (SE-NN) representing different processing (beamformer) settings are added to complement the 'normal' training data).

Figure 6A:
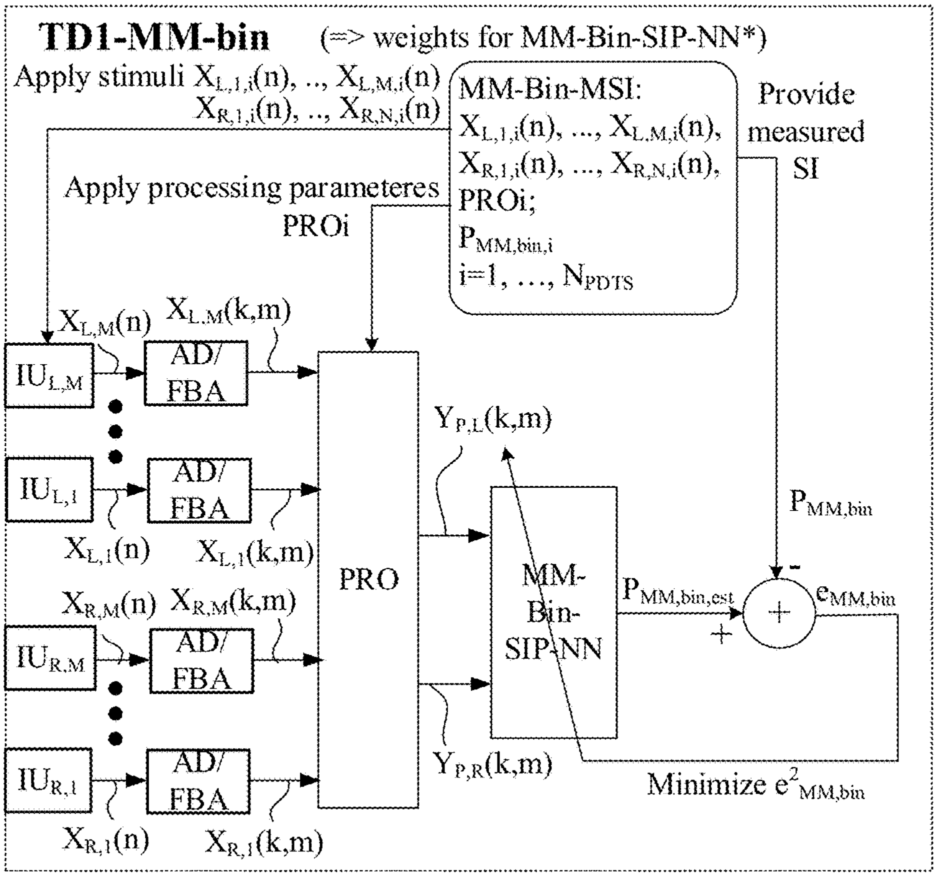
FIG. 6B schematically shows a system for training a second neural network with binaural data comprising (arbitrary) noisy time segments representing a multitude of electric input signals picked up at different locations at or around a user, thereby determining optimized second weights of a second neural network (MM-Bin-SE-NN), while maximizing a speech intelligibility $P_{MM,bin,est}$, estimated by a first optimized (trained) neural network (MM-Bin-SIP-NN*)
FIG. 6C illustrates a third embodiment of a binaural hearing system comprising left and right hearing devices, each comprising a multitude of input units according to the present disclosure.
FIG. 6D illustrates a fourth embodiment of a binaural hearing system comprising left and right hearing devices, each comprising a multitude of input units according to the present disclosure.

FIG. 6A shows a system (TD1-MM-bin) for training a first neural network (MM-Bin-SIP-NN) with multi-input, binaural data having predefined time segments representing a mixture of speech noise and corresponding measured speech intelligibilities $P_{MM,bin}$ of the first database (MM-Bin-MSI). The first neural network (MM-Bin-SIP-NN) provides corresponding estimated speech intelligibilities $P_{MM,bin,est}$, while minimizing a prediction error, thereby providing a first optimized (trained) neural network (MM-Bin-SIP-NN*). The training method illustrated in FIG. 6A is equivalent to a combination of the systems of FIGS. 4B and 5A for binaural (one input) and monaural (multi-input) systems, respectively, as discussed above.

As described in connection with FIG. 5A, alternatively, a multitude of time segments of the left and right processed signals $Y_{P,L,i}$ and $Y_{P,R,i}$ may be stored together with corresponding measured speech intelligibilities $P_{MM,bin,i}$, in the first database MM-bin-MSI, where the time segments of $Y_{P,L,i}$ and $Y_{P,R,i}$ are generated for a multitude of values of the M electric input signals (and types of noise, and mutual spatial configurations of target and noise sound sources), and a variety of processing conditions. Thereby a reduced number of data has to be stored in the database, and only the resulting processed signals ($Y_{P,L,i}$ and $Y_{P,R,i}$) have to be fed from the database to the first neural network (MM-Bin-SIP-NN).

Figure 6B:
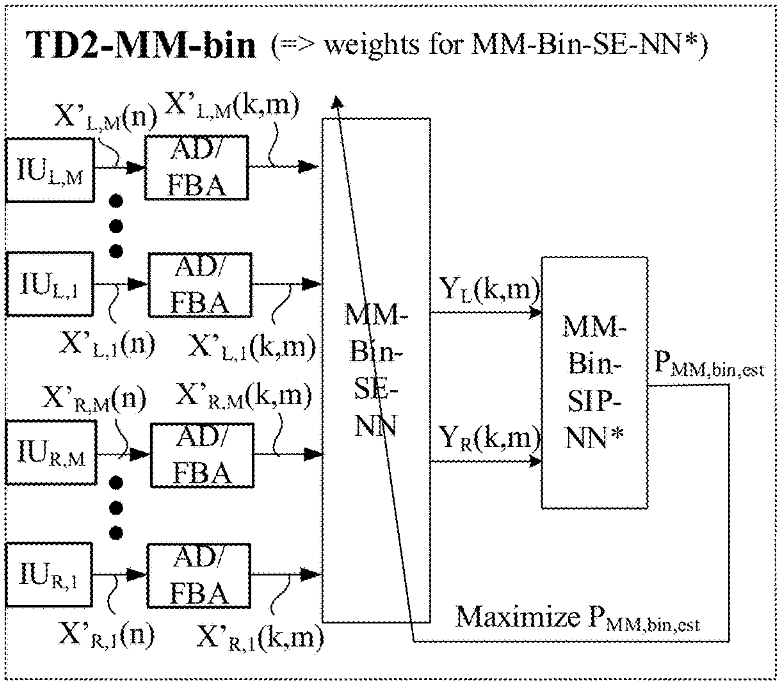

FIG. 6B schematically shows a system (TD2-MM-bin) for training a second neural network (MM-Bin-SE-NN) with binaural data comprising (arbitrary) noisy time segments representing a multitude of electric input signals picked up at different locations at or around a user, thereby determining optimized second weights of the second neural network (MM-Bin-SE-NN), while maximizing a speech intelligibility $P_{MM,bin,est}$, estimated by the first optimized (trained) neural network (MM-Bin-SIP-NN*), as discussed in connection with FIG. 6A. The training method illustrated in FIG. 6B is equivalent to a combination of the systems of FIGS. 4C and 5B for binaural (one input) and monaural (multi-input) systems, respectively, as discussed above.

Figure 6C:
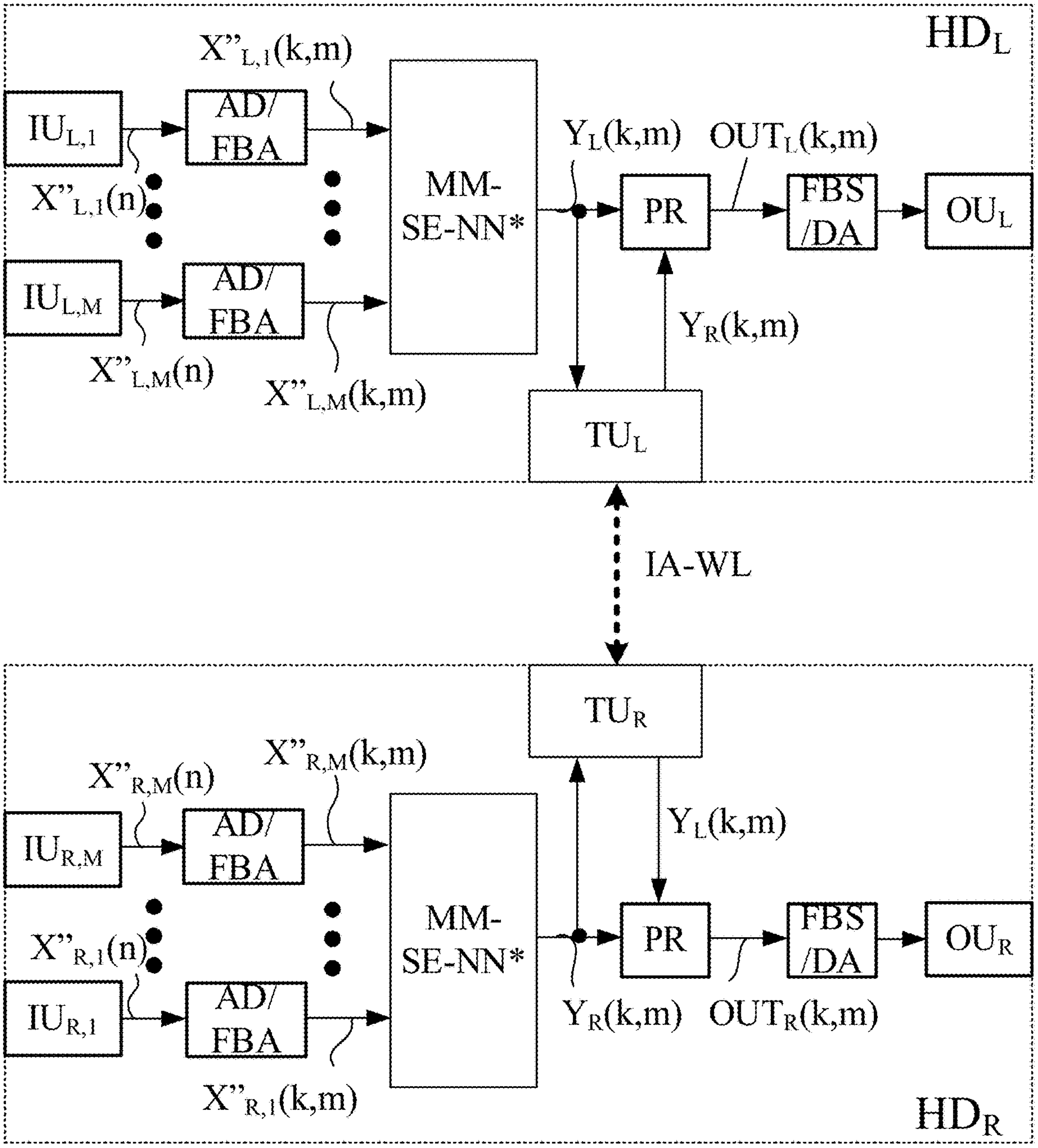

FIG. 6C illustrates a third embodiment of a binaural hearing system comprising left and right hearing devices ($HD_L$, $HD_R$) according to the present disclosure. The left and right hearing devices of FIG. 6C comprise the same elements as the hearing device shown in connection with FIG. 5C and discussed above. Additionally, the embodiment of the left and right hearing devices ($HD_L$, $HD_R$) of FIG. 6C comprises a processing unit (PR), which processes the enhanced electric input signal ($Y_L(k,m)$ and $Y_R(k,m)$, respectively), including taking into account the enhanced electric input signal received from the opposite hearing device via an interaural link (IA-WL) established by respective transceiver units ($TU_L$, $TU_R$). The respective processors (PR) may provide a further enhanced signal $OUT_L(k,m)$ and $OUT_R(k,m)$, respectively, by binaural adjustments (e.g. related to level differences and/or spatial cues based on a comparison of the 'monaurally' generated enhanced left and right signals ($Y_L$(k,m) and $Y_R$(k,m))). The further enhanced signals are fed to the respective synthesis filter banks and output units for presentation to the user as previously indicated in connection with FIG. 5C.

Figure 6D:
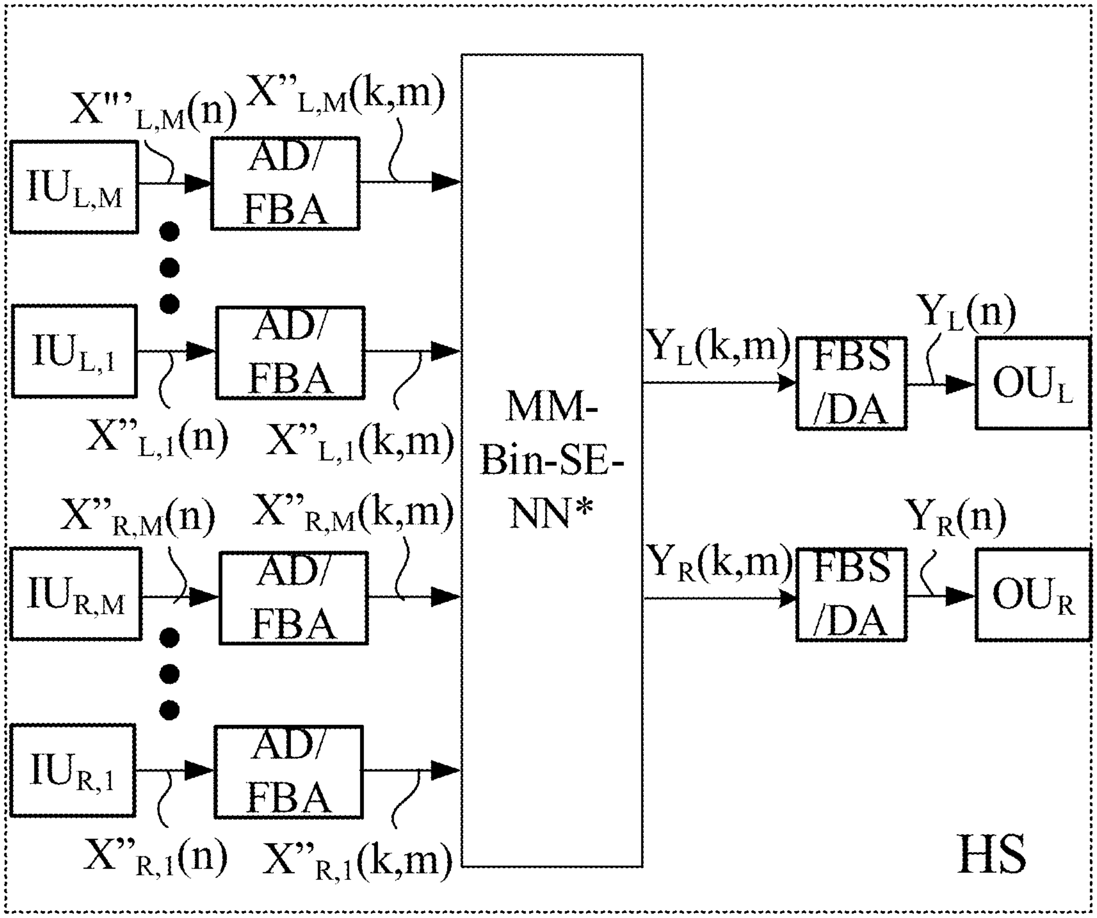

In another embodiment, as illustrated in FIG. 6D, a fully binaural hearing system as described in FIG. 4D or 4E, with a multitude of inputs at each ear can be envisioned. Such system would require an exchange of a multitude of audio signals, though, and thus require a large bandwidth link (and thus a relatively large power consumption). FIG. 6D schematically illustrates an embodiment of a binaural hearing system (HS) comprising a second optimized (trained) neural network (MM-Bin-SE-NN*) according to the present disclosure. The hearing system comprises a multitude of left and right input units ($IU_{L,1}, \ldots, IU_{L,M}$ and $IU_{R,1}, \ldots, IU_{R,M}$, respectively) adapted for being located at or in or around left and right ears of a user to pick up respective multitudes of left and right electric input signals $X''_{L,1}(n), \ldots, X''_{L,M}(n)$, and $X''_{R,1}(n), \ldots, X''_{R,M}(n)$, respectively. This multitude of time domain signals are converted to respective frequency sub-band signals $X''_{L,1}(k,m), \ldots, X''_{L,M}(k,m)$, and $X''_{R,1}(k,m)$, $X''_{R,M}(k,m)$, by respective analysis filter banks (FBA), e.g. including analogue to digital conversion units (AD) (if not provided elsewhere). The second optimized (trained) neural network (MM-Bin-SE-NN*) provides enhanced left and right electric input signals $Y_L$(k,m) and $Y_R$(k,m) providing optimized speech intelligibility for the user. These enhanced signals are fed to respective synthesis filter banks (FBS) and optionally to respective digital to analogue converters (DA). The resulting left and right time domain output signals $Y_L$(n) and $Y_R$(n), are fed to output units $OU_L$ and $OU_R$, respectively, for presentation to the user wearing the hearing system as stimuli perceivable as sound (e.g. as mechanical vibrations propagated via bone conduction or air conduction).

The binaural hearing system (HS) may be configured in a number of different ways, including partitioned in a number of separate devices in communication with each other (cf. e.g. FIG. 4E). Likewise, the number of input units (here indicated to be M in each of the left and right hearing devices, may be equal or different, as requested by the application in question). The same is true for the multi-input systems illustrated in FIGS. 5A-5D and 6A-6C.

Figure 7A:
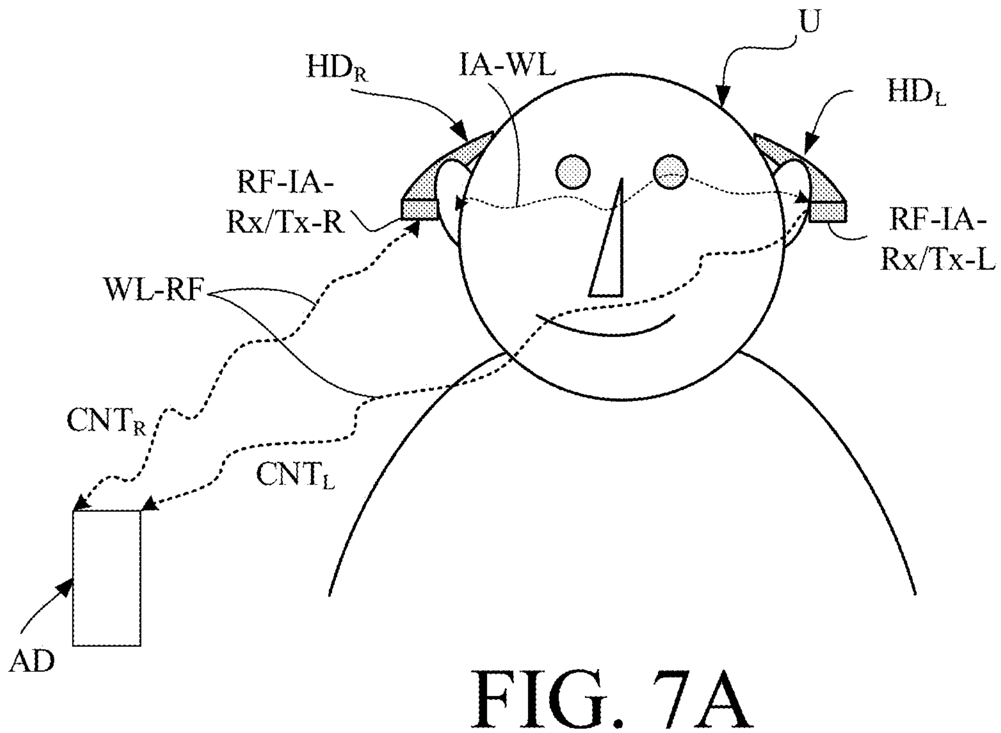
FIG. 7A shows a use case of a binaural hearing system comprising left and right hearing devices and an auxiliary processing device according to the present disclosure.
Figure 7B:
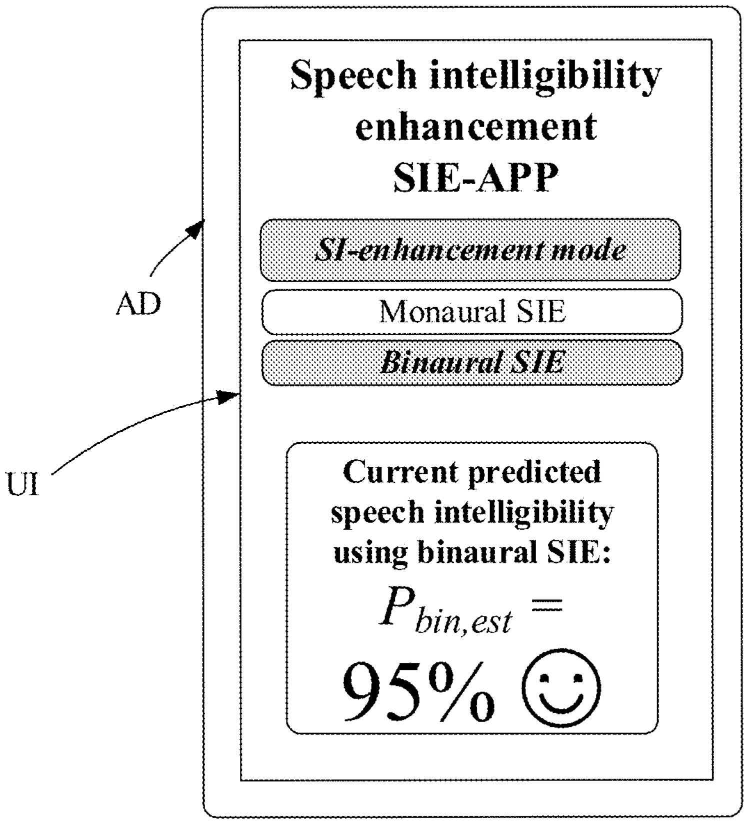
FIG. 7B illustrates a user interface implemented as an APP according to the present disclosure running on the auxiliary device.

FIG. 7A shows a use case of a binaural hearing system comprising left and right hearing devices ($HD_L$, $HD_R$) and an auxiliary processing device (AD) according to the present disclosure. FIG. 7A, 7B show an exemplary application scenario of an embodiment of a hearing system according to the present disclosure. FIG. 7A illustrates a user (U), a binaural hearing aid system ($HD_L$, $HD_R$) and an auxiliary device (AD). FIG. 7B illustrates the auxiliary device (AD) running an APP for configuring the speech intelligibility enhancement unit. The APP is a non-transitory application (APP) comprising executable instructions configured to be executed on the auxiliary device to implement a user interface (UI) for the hearing device(s) ($HD_L$, $HD_R$) or the hearing system. In the illustrated embodiment, the APP is configured to run on a smartphone, or on another portable device allowing communication with the hearing device(s) or the hearing system.

FIG. 7B illustrates a user interface (UI) implemented as an APP according to the present disclosure running on the auxiliary device (AD). The user interface comprises a display (e.g. a touch sensitive display). Via the display of the user interface, the user can interact with the hearing system and hence control functionality of the system. The illustrated screen of the 'Speech intelligibility enhancement SIE-APP' allows the user to activate (or deactivate) a speech intelligibility enhancement mode (according to the present disclosure), cf. grey shaded 'button' denoted 'SI enhancement mode' (the grey shading indicating that the mode is activated). The screen further allows the user to choose between 'Monaural SIE' and 'Binaural SIE' (where Binaural SIE is activated in the example). Monaural and Binaural SIE (speech intelligibility enhancement) refer to speech enhancement based only on local input signals (monaural, cf. e.g. FIG. 1A, 1B, 2, 3, 5A-5D) and speech enhancement based on input signals from both sides of the head (binaural, cf. e.g. FIG. 4A-4E, 6A-6B). The screen informs the user about a current (average) estimated binaural speech intelligibility $P_{bin,est}$=95% (which is indicated to be satisfactory by the smiley).

The auxiliary device (AD) comprising the user interface (UI) is preferably adapted for being held in a hand of a user (U).

In the embodiment of FIG. 7A, wireless links denoted IA-WL (e.g. an inductive link between the hearing left and right assistance devices) and WL-RF (e.g. RF-links (e.g. Bluetooth) between the auxiliary device (AD) and the left ($HD_L$) and between the auxiliary device (AD) and the right ($HD_R$), hearing device, respectively) are indicated (implemented in the devices by corresponding antenna and transceiver circuitry, indicated in FIG. 7A in the left and right hearing devices as RF-IA-Rx/Tx-L and RF-IA-Rx/Tx-R, respectively).

In an embodiment, the auxiliary device (AD) is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device. In an embodiment, the auxiliary device (AD) is or comprises a remote control for controlling functionality and operation of the hearing device(s). In an embodiment, the function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

In an embodiment, the hearing system, including the user interface (UI), is configured to allow a user to indicate a location of or a direction to a sound source of current interest to the user. In an embodiment, the hearing system, including the user interface (UI), is configured to allow a user to indicate a current acoustic environment of the user. Thereby, predefined specifically optimized (second) neural networks (e.g. SE-DNN*x, x=location 1, . . . , location $N_L$, or x=environment 1, . . . , environment $N_E$) may be loaded in the hearing system, e.g. the hearing device(s). This has the advantage of enabling a less complicated optimized neural network (thereby saving memory and processing power). Different spatial locations of the sound source of current interest may e.g. include one or more of in front, to the left, to the right, to the rear, in left front quarter plane, in right front quarter plane, in rear half plane, etc. Different acoustic environments may e.g. include, speech in quiet, speech in a car, speech in a multi talker environment (cocktail party), speech in reverberation, etc. In an embodiment, predefined specifically optimized (second) neural networks (e.g. SE-DNN*y, y=P1, . . . , $P_{NP}$) are automatically loaded, when a specific hearing aid program is chosen by the user (e.g. via the user interface, or automatically chosen via an environment detector (classification unit). In an embodiment, a specific optimized (second) neural network is automatically loaded when the user (wearer of the hearing system) is talking, as e.g. detected by an own voice detector of the hearing system.

Figure 8:
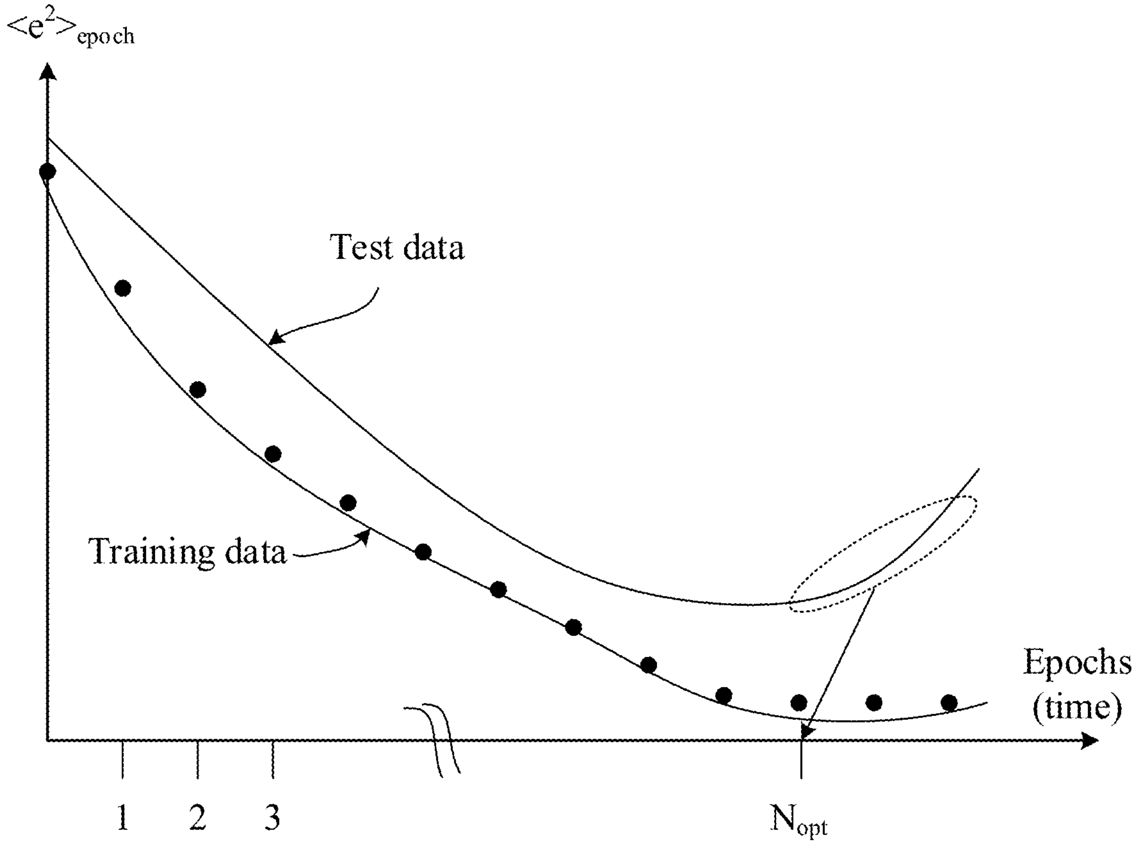
FIG. 8 shows (squared, average) estimated prediction error $<e^2>$ of speech intelligibility versus time of a (first) neural network (SIP-NN) during training with predefined a database (MSI) comprising predefined time segments representing a mixture of speech noise and corresponding measured speech intelligibilities of the first database, the (first) neural network providing corresponding estimated speech intelligibilities, while minimizing the prediction error $<e>$, using (different) training data and test data respectively.

FIG. 8 shows (squared, average) estimated prediction error <e2> of speech intelligibility versus time of a (first) neural network (SIP-NN) during training with predefined a database (MSI) comprising predefined time segments representing a mixture of speech noise and corresponding measured speech intelligibilities of the first database, the (first) neural network providing corresponding estimated speech intelligibilities, while minimizing the prediction error <e>, using (different) training data and test data respectively. The prediction error is defined as the difference between a measured speech intelligibility (P) of a known speech element (e.g. a sentence), e.g. provided by a listening test, and an estimated speech intelligibility ($P_{est}$ (or $\hat{P}$), e.g. provided by the neural network SIP-DNN (cf. e.g. FIG. 2). The iterative algorithm (Minimize $e^2$, cf. e.g. FIG. 2) comprises a) applying a batch of data (or all data) of the training set of the database MSI comprising predefined time segments of sound comprising speech (and typically additional noise) and corresponding speech intelligibilities obtained from a listening test (of a normally hearing person). After each epoch, the average estimated prediction error $<e^2>_{epoch}$ is evaluated, and new set of weights of the neural network is determined (e.g. according to a steepest decent algorithm). This procedure is continued until a minimum in average estimated prediction error $<e^2>_{epoch}$ has been arrived. In parallel or subsequently, the same weights are used on a test data set (different from the training data set) and the average estimated prediction error $<e^2>_{epoch}$ is evaluated. When (if) the average estimated prediction error $<e^2>_{epoch}$ starts to increase (as indicated by dotted ellipse and arrow to $N_{opt}$ on the Epochs (time) axis), the weights w corresponding to the preceding minimum (at epoch $N_{opt}$) in average prediction error are chosen as the optimized weights. In other words, the weights w of the neural network used in the $N_{opt}^{th}$ epoch are frozen, thereby providing a first optimized (trained) neural network (SIP-NN*) represented by optimized weights $w_{opt}$. Preferably (to minimize the need for storing optimized parameters for all epochs), the average estimated prediction error $<e^2>_{epoch}$ using the test data is evaluated right after the corresponding evaluation of the training data. Preferably a small number of sets of optimized parameters of the neural network for a number of previous epochs (e.g. 4) are stored to allow easy back tracking (e.g. in connection with identification of a minimum in the estimated prediction error $<e^2>_{epoch}$ of the test data. Thereby an 'early stopping' procedure can be implemented.

Figure 9A:
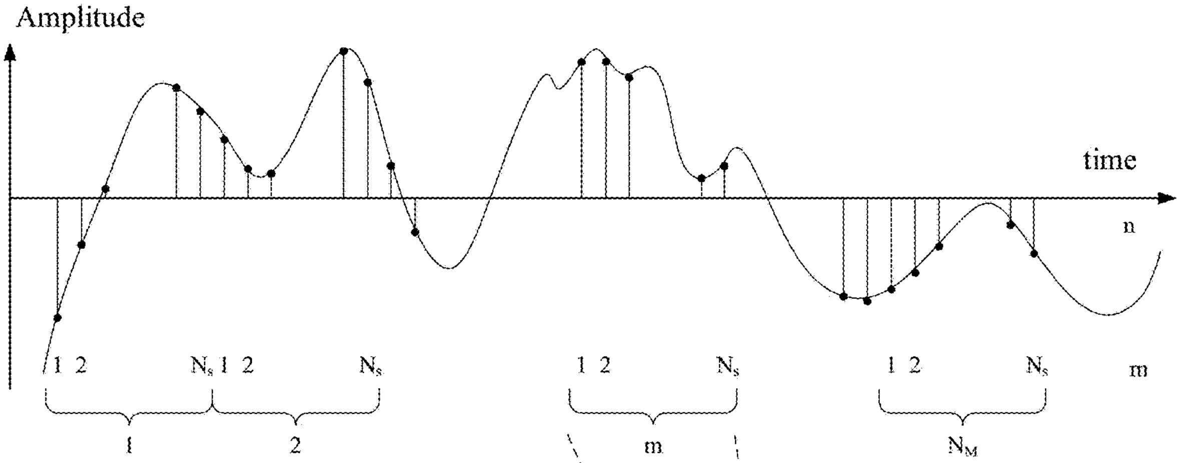
FIG. 9A schematically illustrates a time variant analogue signal (Amplitude vs time) and its digitization in samples, the samples being arranged in a number of time frames, each comprising a number $N_s$ of samples, FIG. 9B schematically illustrates a time-frequency representation of the time variant electric signal of FIG. 9A, and FIG. 9C schematically illustrates a neural network for determining an output signal with enhanced intelligibility from a noisy input signal in a time-frequency representation, and FIG. 10 schematically shows an embodiment of a RITE-type hearing device according to the present disclosure comprising a BTE-part, an ITE-part and a connecting element.

FIG. 9A schematically illustrates a time variant analogue signal (Amplitude vs time) and its digitization in samples, the samples being arranged in a number of time frames, each comprising a number $N_s$ of samples. FIG. 9A shows an analogue electric signal (solid graph), e.g. representing an acoustic input signal, e.g. from a microphone, which is converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples y(n) at discrete points in time n, as indicated by the vertical lines extending from the time axis with solid dots at their endpoint 'coinciding' with the graph, and representing its digital sample value at the corresponding distinct point in time n. Each (audio) sample y(n) represents the value of the acoustic signal at n (or $t_n$) by a predefined number $N_b$ of bits, $N_b$ being e.g. in the range from 1 to 48 bit, e.g. 24 bits. Each audio sample is hence quantized using $N_b$ bits (resulting in $2^{Nb}$ different possible values of the audio sample).

In an analogue to digital (AD) process, a digital sample y(n) has a length in time of $1/f_s$, e.g. 50 μs, for $f_s$=20 kHz. A number of (audio) samples $N_s$ are e.g. arranged in a time frame, as schematically illustrated in the lower part of FIG. 9A, where the individual (here uniformly spaced) samples are grouped in time frames (1, 2, . . . , $N_s$)). As also illustrated in the lower part of FIG. 7A, the time frames may be arranged consecutively to be non-overlapping (time frames 1, 2, . . . , m, . . . , M), where m is time frame index. Alternatively, the frames may be overlapping (e.g. 50%). In an embodiment, a time frame comprises 64 audio data samples. Other frame lengths may be used depending on the practical application. A time frame may e.g. have a duration of 3.2 ms.

Figure 9B:
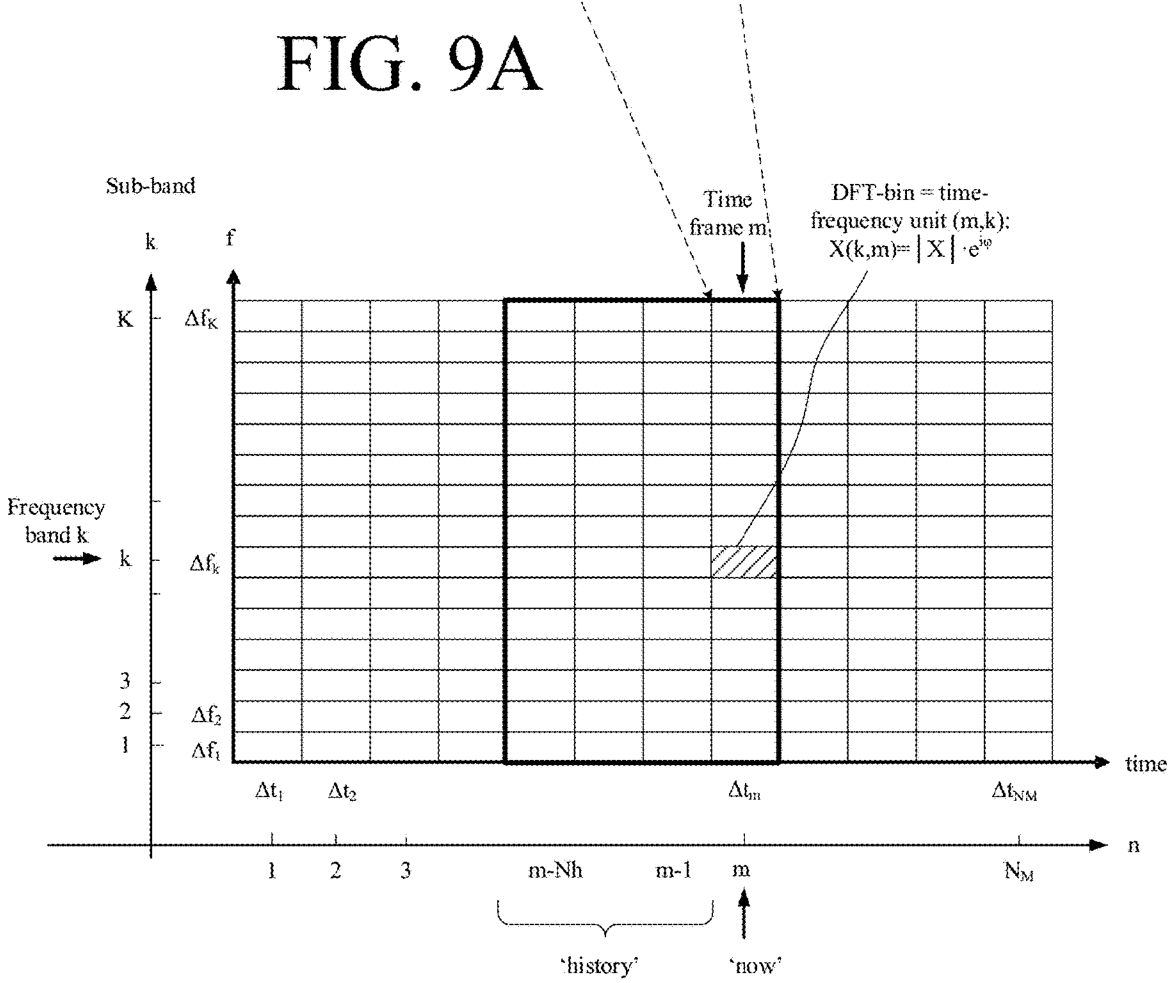

FIG. 9B schematically illustrates a time-frequency map representation of the time variant electric signal y(n) of FIG. 9A. The time-frequency representation comprises an array or map of corresponding complex or real values of the signal in a particular time and frequency range. The time-frequency representation may e.g. be a result of a Fourier transformation converting the time variant input signal y(n) to a (time variant) signal Y(k,m) in the time-frequency domain. In an embodiment, the Fourier transformation comprises a discrete Fourier transform algorithm (DFT). The frequency range considered by a typical hearing aid (e.g. a hearing aid) from a minimum frequency $f_{min}$ to a maximum frequency $f_{max}$ comprises a part of the typical human audible frequency range from 20 Hz to 20 kHz, e.g. a part of the range from 20 Hz to 12 kHz. In FIG. 9B, the time-frequency representation Y(k,m) of signal y(n) comprises complex values of magnitude and/or phase of the signal in a number of DFT-bins (or tiles) defined by indices (k,m), where k=1, . . . , K represents a number K of frequency values (cf. vertical k-axis in FIG. 9B) and m=1, . . . , $N_M$ represents a number $N_M$ of time frames (cf. horizontal m-axis in FIG. 9B). A time frame is defined by a specific time index m and the corresponding K DFT-bins (cf. indication of Time frame m in FIG. 9B). A time frame m represents a frequency spectrum of signal x at time m. A DFT-bin or tile (k,m) comprising a (real) or complex value X(k,m) of the signal in question is illustrated in FIG. 7B by hatching of the corresponding field in the time-frequency map (cf. DFT-bin=time frequency unit (k,m): $X(k,m)=|X|\cdot e^{i\varphi}$ in FIG. 9B, where |X| represents a magnitude and φ represents a phase of the signal in that time-frequency unit. Each value of the frequency index k corresponds to a frequency range $\Delta f_k$, as indicated in FIG. 9B by the vertical frequency axis f. Each value of the time index m represents a time frame. The time $\Delta t_m$ spanned by consecutive time indices depend on the length of a time frame and the degree of overlap between neighbouring time frames (cf. horizontal time-axis in FIG. 9B).

Figure 9C:
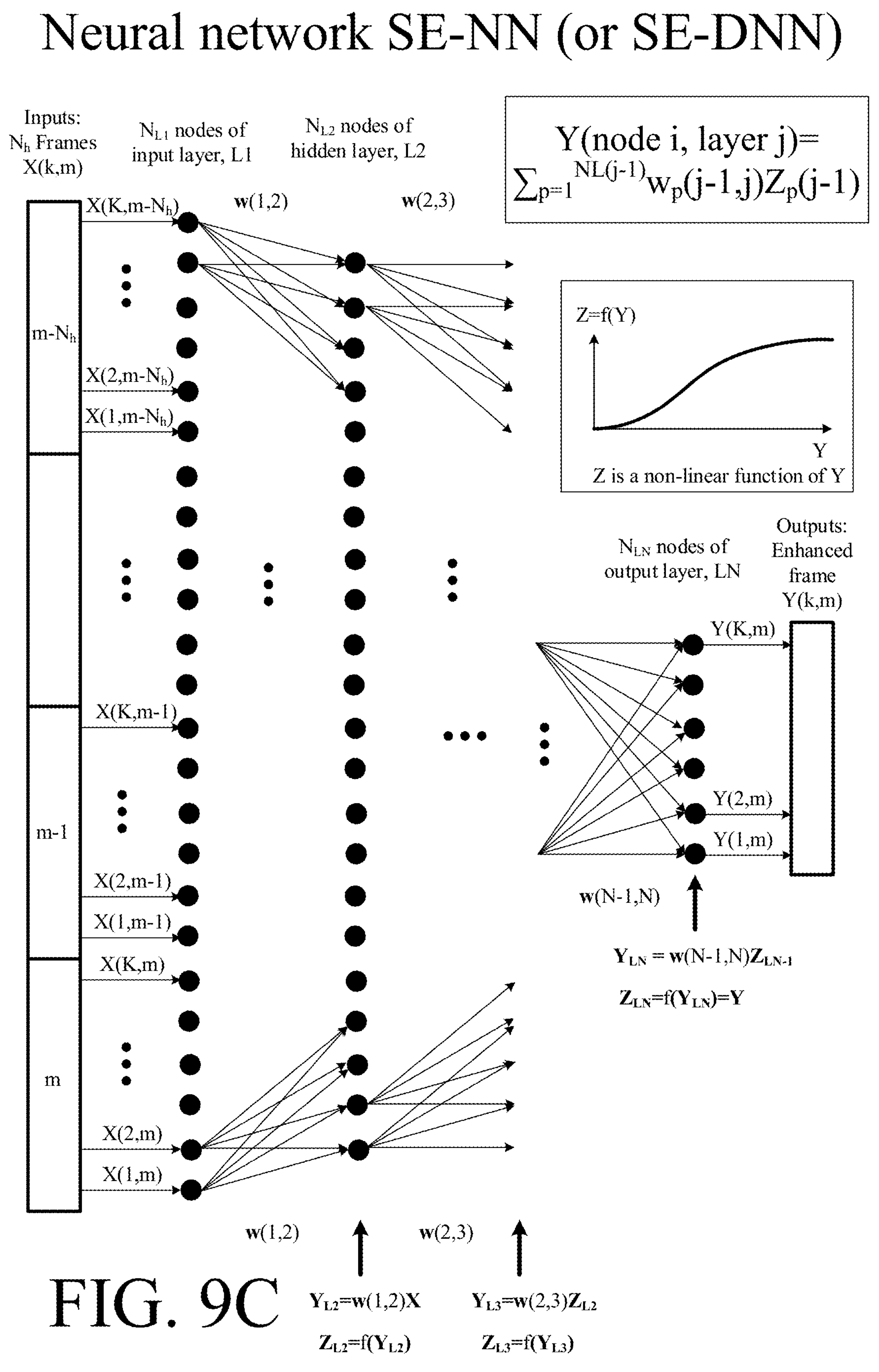

The $m^{th}$ time frame is denoted 'now' and the $m^{th}$ time frame and a number $N_h$ of preceding time frames (denoted 'history') are enclosed by a bold frame and used as inputs to the neural network illustrated in FIG. 9C. The inputs may, alternatively be a number of consecutive 'time domain time frames'.

FIG. 9C schematically illustrates a neural network for determining an output signal Y(k,m) with enhanced intelligibility from a noisy input signal X(k,m) in a time-frequency representation. A present time frame and a number $N_h$ of preceding time frames are stacked to a vector and used as input layer in a neural network. Each frame comprises K (e.g. K=64 or K=128) values of a (noisy) electric input signal, e.g. X(k,m), k=1, . . . , K in FIG. 1B. The signal may be represented by its magnitude |X(k,m)| (e.g. by ignoring its phase φ). An appropriate number of time frames is related to the correlation inherent in speech. In an embodiment, the number $N_h$ of previous time frames which are considered together with the present one may e.g. correspond to a time segment of duration of more than 20 ms, e.g. more than 50 ms, such as more than 100 ms. In an embodiment, the number of time frames considered (=$N_h$+1) are larger than or equal to 4, e.g. larger than or equal to 10, such as larger than or equal to 24. The width of the neural network is in the present application equal to K($N_h$+1), which for K=64 and $N_h$=9 amounts to $N_{L1}$=640 nodes of the input layer L1 (representing a time segment of the audio input signal of 32 ms (for a sampling frequency of 20 kHz and a number of samples per frame of 64 and assuming non-overlapping time frames)). The number of nodes ($N_{L2}$, . . . , $N_{LN}$) in subsequent layers (L2, . . . , LN) may be larger or smaller than the number of nodes $N_{L1}$ of the input layer L1, and in general adapted to the application (in view of the available number of input data sets and the number of parameters to be estimated by the neural network). In the present case the number of nodes $N_{LN}$ in the output layer LN is K (e.g. 64) in that it comprises K time-frequency tiles of a frame of the enhanced output signal Y(k,m).

FIG. 9C is intended to illustrate a general multi-layer neural network of any type, e.g. deep neural network, here embodied in a standard feed forward neural network. The depth of the neural network (the number of layers), denoted N in FIG. 9C, may be any number and typically adapted to the application in question (e.g. limited by a size and/or power supply capacity of the device in question, e.g. a portable device, such as a hearing aid). In an embodiment, the number of layers in the neural network is larger than or equal to two or three. In an embodiment, the number of layers in the neural network is smaller than or equal to four or five.

The nodes of the neural network illustrated in FIG. 9C is intended to implement standard functions of neural network to multiply the values of branches from preceding nodes to the node in question with weights associated with the respective branches and to add the contributions together to a summed value $Y'_{i,j}$ for node i in layer j. The summed value $Y'_{i,j}$ is subsequently subject to a non-liner function f, providing a resulting value $Z_{i,j}$=f($Y'_{i,j}$) for node i in layer j. This value is fed to the next layer (j+1) via the branches connecting node i in layer j with the nodes of layer j+1. In FIG. 9C the summed value $Y'_{i,j}$ for node i in layer j (i.e. before the application of the non-linear (activation) function to provide the resulting value for node i of layer j) is expressed as:

$$Y'_{i,j}=\Sigma_{p=1}^{NL(j-1)}w_{p,i}(j-1,j)Z_p(j-1)$$

where $w_{p,i}$(j−1,j) denotes the weight for node p in layer L(j−1) to be applied to the branch from node p in layer j−1 to node i in layer j, and $Z_p$(j−1) is the signal value of the $p^{th}$ node in layer j−1. In an embodiment, the same activation function *f* is used for all nodes (this may not necessarily be the case, though). An exemplary non-linear activation function Z=f(Y) is schematically illustrated in the insert in FIG. 9C. Typical functions used in neural networks are the sigmoid function and the hyperbolic tangent function (tan h). Other functions may be used, though, as the case may be. Further, the activation function may be parametrized.

Together, the (possibly parameterized) activity function and the weights w of the different layers of the neural network constitute the parameters of the neural network. They represent the parameters that (together) are optimized in respective iterative procedures for the first and second neural networks of the present disclosure. In an embodiment, the same activation function *f* is used for all nodes (so in that case, the 'parameters of the neural network' are constituted by the weights of the layers).

The neural network of FIG. 9C may e.g. represent a (second) neural network according to the present disclosure (cf. e.g. SE-DNN in FIG. 1B, or BIN-SE-NN* in FIG. 4D, 4E, etc.).

The structure of a first neural network according to the present disclosure (cf. e.g. SIP-DNN in FIG. 2, or BIN-SIP-NN in FIG. 4B, etc.) is equivalent to the one illustrated in FIG. 9C. A difference is that the output layer consists of a single node providing as an output an estimated intelligibility $P_{est}$ (also denoted $\hat{P}$) of speech components in the input signal(s). Likewise, the input layer of the first neural network may be different in width, adapted to the basic building blocks of the language in question (e.g. comprising a time segment comparable in time to one or more words, e.g. a sentence, e.g. comprising a number of time frames of the electric input signals corresponding to 0.5 s or 1 s of speech, or more. Also, the depth of the two neural networks may be different.

Typically, the first neural network according to the present disclosure is optimized (trained) in an offline procedure (e.g. as indicated in FIG. 2, 4B, 5A, 6A), e.g. using a model of the head and torso of a human being (e.g. Head and Torso Simulator (HATS) 4128C from Brüel & Kjær Sound & Vibration Measurement A/S). Likewise, the second neural network according to the present disclosure may be optimized (trained) in an offline procedure (e.g. as indicated in FIG. 3, 4C, 5B, 6B), e.g. using an 'average model'. Alternatively or additionally, the second neural network according to the present disclosure may be optimized (trained) or fine-tuned in a specific training mode, while the user wears a hearing device or hearing system according to the present disclosure. In an embodiment, data for training the second neural network (possibly in an offline procedure) may be picked up and stored while the user wears the hearing device or hearing system, e.g. over a longer period of time, e.g. days, weeks or even months. Such data may e.g. be stored in an auxiliary device (e.g. a dedicated, e.g. portable storage device, or in a smartphone). This has the advantage that the training data are relevant for the user's normal behaviour and experience of acoustic environments.

Figure 10:
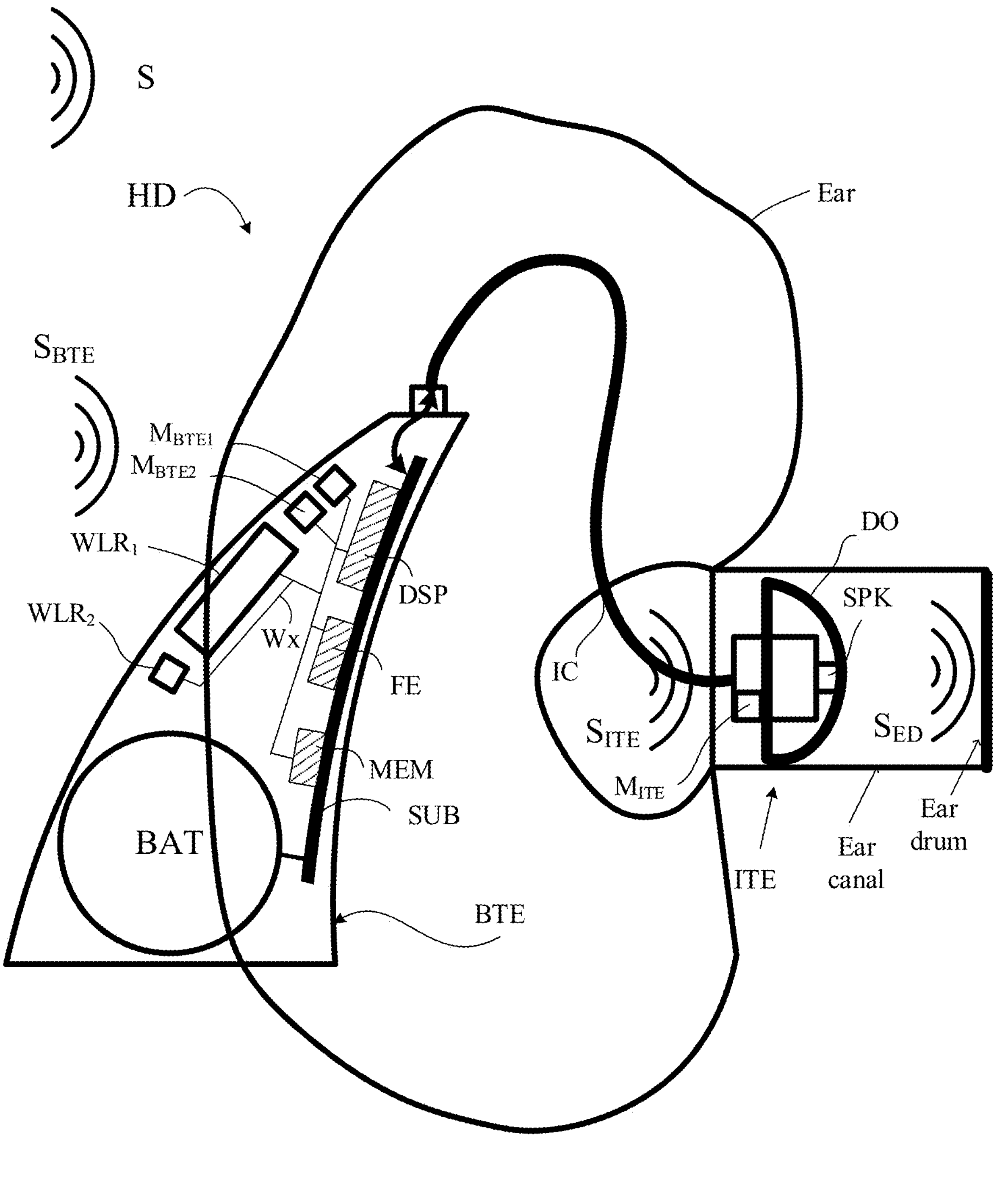

FIG. 10 schematically shows an embodiment of a hearing device according to the present disclosure. The hearing device (HD), e.g. a hearing aid, is of a particular style (sometimes termed receiver-in-the ear, or RITE, style) comprising a BTE-part (BTE) adapted for being located at or behind an ear of a user, and an ITE-part (ITE) adapted for being located in or at an ear canal of the user's ear and comprising a receiver (loudspeaker). The BTE-part and the ITE-part are connected (e.g. electrically connected) by a connecting element (IC) and internal wiring in the ITE- and BTE-parts (cf. e.g. wiring Wx in the BTE-part).

In the embodiment of a hearing device in FIG. 10, the BTE part comprises two input units (e.g. $IU_1$, $IU_M$ (for M=2) in FIG. 5C, 5D) comprising respective input transducers (e.g. microphones) ($M_{BTE1}$, $M_{BTE2}$), each for providing an electric input audio signal representative of an input sound signal ($S_{BTE}$) (originating from a sound field S around the hearing device). The input unit further comprises two wireless receivers ($WLR_1$, $WLR_2$) (or transceivers) for providing respective directly received auxiliary audio and/or control input signals (and/or allowing transmission of audio and/or control signals to other devices). The hearing device (HD) comprises a substrate (SUB) whereon a number of electronic components are mounted, including a memory (MEM) e.g. storing different hearing aid programs (e.g. parameter settings defining such programs, or parameters of algorithms, e.g. optimized parameters of a neural network) and/or hearing aid configurations, e.g. input source combinations ($M_{BTE1}$, $M_{BTE2}$, $WLR_1$, $WLR_2$), e.g. optimized for a number of different listening situations. The substrate further comprises a configurable signal processor (DSP, e.g. a digital signal processor, including the processor (HLC), feedback suppression (FBC) and beamformers (BFU) and other digital functionality of a hearing device according to the present disclosure). The configurable signal processing unit (DSP) is adapted to access the memory (MEM) and for selecting and processing one or more of the electric input audio signals and/or one or more of the directly received auxiliary audio input signals, based on a currently selected (activated) hearing aid program/parameter setting (e.g. either automatically selected, e.g. based on one or more sensors and/or on inputs from a user interface). The mentioned functional units (as well as other components) may be partitioned in circuits and components according to the application in question (e.g. with a view to size, power consumption, analogue vs. digital processing, etc.), e.g. integrated in one or more integrated circuits, or as a combination of one or more integrated circuits and one or more separate electronic components (e.g. inductor, capacitor, etc.). The configurable signal processor (DSP) provides a processed audio signal, which is intended to be presented to a user. The substrate further comprises a front end IC (FE) for interfacing the configurable signal processor (DSP) to the input and output transducers, etc., and typically comprising interfaces between analogue and digital signals. The input and output transducers may be individual separate components, or integrated (e.g. MEMS-based) with other electronic circuitry.

The hearing device (HD) further comprises an output unit (e.g. an output transducer) providing stimuli perceivable by the user as sound based on a processed audio signal from the processor (HLC) or a signal derived therefrom. In the embodiment of a hearing device in FIG. 10, the ITE part comprises the output unit in the form of a loudspeaker (receiver) for converting an electric signal to an acoustic (air borne) signal, which (when the hearing device is mounted at an ear of the user) is directed towards the ear drum (Ear drum), where sound signal ($S_{ED}$) is provided. The ITE-part further comprises a guiding element, e.g. a dome, (DO) for guiding and positioning the ITE-part in the ear canal (Ear canal) of the user. The ITE-part further comprises a further input transducer, e.g. a microphone ($M_{ITE}$), for providing an electric input audio signal representative of an input sound signal ($S_{ITE}$).

The electric input signals (from input transducers $M_{BTE1}$, $M_{BTE2}$, $M_{ITE}$) may be processed according to the present disclosure in the time domain or in the (time-) frequency domain (or partly in the time domain and partly in the frequency domain as considered advantageous for the application in question).

The hearing device (HD) exemplified in FIG. 10 is a portable device and further comprises a battery (BAT), e.g. a rechargeable battery, e.g. based on Li-Ion battery technology, e.g. for energizing electronic components of the BTE- and possibly ITE-parts. In an embodiment, the hearing device, e.g. a hearing aid (e.g. the processor (HLC)), is adapted to provide a frequency dependent gain and/or a level dependent compression and/or a transposition (with or without frequency compression) of one or more frequency ranges to one or more other frequency ranges, e.g. to compensate for a hearing impairment of a user.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. As an example, it should be noted that although the embodiments illustrated in FIG. 1B, 2, 3, 4B, 4C, 4D 5A, 5B, 5C, 5D, 6A, 6B, 6C, 6D, 9C, all comprise an analysis filter bank to provide an electric input signal in a time-frequency (or frequency sub-band) representation, other embodiments according to the present disclosure may be provided without separate dedicated analysis filter banks. (In such embodiments, it is left to the first and second algorithms (e.g. first and second neural networks) to work directly on the raw time domain signal samples (or time frames comprising a specific number of number of time samples generated therefrom).

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[1] M. Kolbek, Z.-H. Tan, and J. Jensen, "Speech intelligibility potential of general and specialized deep neural network based speech enhancement systems," IEEE Trans. Audio, Speech, Language Process., vol. 25, no. 1, pp. 153-167, 2017.

[2] E. W. Healy, S. E. Yoho, Y. Wang, and D. Wang, "An algorithm to improve speech recognition in noise for hearing-impaired listeners," J. Acoust. Soc. Am., vol. 134, no. 4, pp. 3029-3038, October 2013.

[3] A. H. Andersen, J. M. de Haan, Z.-H. Tan and J. Jensen, "Non-intrusive speech intelligibility prediction using convolutional neural networks," IEEE/ACM Transactions on Audio, Speech, and Language Processing, Vol. 26, No. 10, pp. 1925-1939, October 2018.

[4] I. Goodfellow, Y. Bengio, and A. Courville, "Deep Learning", MIT Press, 2016.

The invention claimed is:

1. A method of training an algorithm for optimizing intelligibility of speech components of a sound signal, the method comprising, providing a first database (MSI) comprising
- a multitude of predefined time segments $PDTS_i=1, \ldots, N_{PDTS}$, of first electric input signals representing sound, each time segment comprising
  - a speech component representing at least one phoneme, or syllable, or word, or
  - a processed or filtered version of said speech component, and/or
  - a noise component, and
- corresponding measured speech intelligibilities $P_i$, $i=1, \ldots, N_{PDTS}$, of each of said predefined time segments $PDTS_i$;

determining optimized first parameters of a first algorithm by optimizing it with at least some of said predefined time segments $PDTS_i$ and said corresponding measured speech intelligibilities P, of said first database (MSI), the first algorithm providing corresponding predicted speech intelligibilities $P_{est,i}$ said optimizing being conducted under a constraint of minimizing a cost function of said predicted speech intelligibilities;

providing a second database (NSIG) comprising, or otherwise providing access to, a multitude of time segments $TS_j$, $j=1, \ldots, N_{TS}$, of second electric input signals representing sound, each time segment comprising
- a speech component representing at least one phoneme, or syllable, or word, or
- a processed or filtered version of said speech component, and/or
- a noise component;

determining optimized second parameters of a second algorithm by optimizing it with at least some of said multitude of time segments $TS_j$, where said second algorithm is configured to provide processed versions of said second electric input signals exhibiting respective predicted speech intelligibilities $P_{est,j}$ estimated by said first algorithm, said optimizing being conducted under a constraint of maximizing said predicted speech intelligibility $P_{est,j}$, or a processed, version thereof.

2. A method according to claim 1 wherein said first database (MSI) comprises two sets of predefined time segments $PDTS_{L,i}$, $PDTS_{R,i}$ of first electric input signals representing sound at respective left and right ears of a user ($i=1, \ldots, N_{PDTS}$), and corresponding measured speech intelligibilities $P_i$, $i=1, \ldots N_{PDTS}$, of each of said sets of predefined time segments $PDTS_{L,i}$, $PDTS_{R,i}$.

3. A method according to claim 1 wherein said first and/or second algorithm is or comprises a neural network.

4. A method according to claim 1 wherein the training of the first and/or second algorithm(s) comprise(s) a random initialization and a subsequent iterative update of parameters of the algorithm in question.

5. A method according to claim 1 wherein the training of the first and/or second algorithm(s) comprises minimizing a cost function.

6. A method according to claim 5 wherein the cost function is minimized using an iterative stochastic gradient descent or ascent approach.

7. A method according to claim 5 wherein the cost function of the first algorithm comprises a prediction error $e_i$.

8. A method according to claim 1 wherein the predefined time segments $PDTS_i$ of the first database, which are used to train the first algorithm, and/or the time segments $TS_i$ of the second database, which are used to train the second algorithm, are arranged to comprise a number of consecutive time frames of the time segments in question, which are fed to the first and/or to the second algorithm, respectively, at a given point in time.

9. A method according to claim 1 wherein said first electric input signals representing sound, and/or said second electric input signals representing sound are each provided as a number of frequency sub-band signals.

10. A method according to claim 1 comprising using said optimized second algorithm in a hearing device for optimizing speech intelligibility of noisy or processed electric input signals comprising speech, and to provide optimized electric sound signals.

11. A method according to claim 1 comprising providing at least one set of output stimuli perceivable as sound by the user and representing processed versions of said noisy or processed electric input signals comprising speech.

12. A hearing device adapted to be worn in or at an ear of a user, and/or to be fully or partially implanted in the head of the user, and comprising
- An input unit providing at least one electric input signal representing sound comprising speech components; and
- An output unit for providing at least one set of stimuli representing said sound and perceivable as sound to the user based on processed versions of said at least one electric input signal,
- A processing unit connected to said input unit and to said output unit and comprising a second algorithm optimized according to the method of claim 1 to provide processed versions of said at least one electric input signal exhibiting an optimized speech intelligibility.

13. A hearing device according to claim 12 constituting or comprising a hearing aid, a headset, an earphone, an ear protection device or a combination thereof.

14. A hearing system comprising left and right hearing devices according to claim 12, the left and right hearing devices being configured to be worn in or at left and right ears, respectively, of said user, and/or to be fully or partially implanted in the head at left and right ears, respectively, of the user, and being configured to establish a wired or wireless connection between them allowing data to be exchanged between them, optionally via an intermediate device.

15. A non-transitory computer-readable medium storing a computer program comprising instructions which, when the program is executed by a computer, cause the computer to carry out the method of claim 1.

16. A hearing aid adapted to be worn in or at an ear of a user, and/or to be fully or partially implanted in the head of the user, and adapted to improve the user's intelligibility of speech, the hearing aid comprising An input unit providing at least one electric input signal representing sound comprising speech components; and An output unit for providing at least one set of stimuli representing said sound perceivable as sound to the user, said stimuli being based on processed versions of said at least one electric input signal, A processing unit connected to said input unit and to said output unit and comprising a second deep neural network, which is trained in a procedure to maximize an estimate of the user's intelligibility of said speech components, and in an operating mode of operation where that second deep neural network has been trained is configured to provide a processed signal based on said at least one electric input signal or a signal derived therefrom, wherein said estimate of the user's intelligibility of said speech components is provided by a first deep neural network which has been trained in a supervised procedure with predefined time segments comprising speech components and/or noise components and corresponding measured speech intelligibilities, said training being conducted under a constraint of minimizing a cost function.

17. The hearing aid of claim 16 wherein said first deep neural network has been trained in an offline procedure, before the hearing aid is taken into use by the user.

18. The hearing aid of claim 16 wherein said minimization of a cost function comprises a minimization of a mean squared prediction error $e_i^2$ of said predicted speech intelligibilities using an iterative stochastic gradient descent, or ascent, based method.

19. The hearing aid of claim 16 wherein said stimuli are based on said processed signal from said second neural network or further processed versions thereof.

20. The hearing aid of claim 16 wherein said second neural network is configured to be trained in a specific training mode of operation of the hearing aid, while the user is wearing the hearing aid.

* * * * *